US012294158B2

(12) United States Patent
Wang et al.

(10) Patent No.: US 12,294,158 B2
(45) Date of Patent: May 6, 2025

(54) ELECTRONIC DEVICE

(71) Applicant: Huawei Technologies Co., Ltd., Shenzhen (CN)

(72) Inventors: Jiaming Wang, Shanghai (CN); Liang Xue, Shanghai (CN); Dong Yu, Shanghai (CN); Jikang Wang, Shanghai (CN); Jiaqing You, Shanghai (CN); Yiwen Gong, Shanghai (CN); Fangchao Zhao, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 131 days.

(21) Appl. No.: 17/927,937

(22) PCT Filed: Apr. 28, 2021

(86) PCT No.: PCT/CN2021/090440
§ 371 (c)(1),
(2) Date: Nov. 28, 2022

(87) PCT Pub. No.: WO2021/238557
PCT Pub. Date: Dec. 2, 2021

(65) Prior Publication Data

US 2023/0208032 A1 Jun. 29, 2023

(30) Foreign Application Priority Data

May 27, 2020 (CN) ......................... 202010463851.5

(51) Int. Cl.
*H01Q 5/307* (2015.01)
*H01Q 1/24* (2006.01)
(Continued)

(52) U.S. Cl.
CPC ............ *H01Q 5/307* (2015.01); *H01Q 1/243* (2013.01); *H01Q 1/48* (2013.01); *H01Q 5/50* (2015.01); *H01Q 9/0407* (2013.01)

(58) Field of Classification Search
CPC .......... H01Q 5/307; H01Q 1/243; H01Q 1/48; H01Q 5/50; H01Q 9/0407; H01Q 5/328;
(Continued)

(56) References Cited

U.S. PATENT DOCUMENTS

2006/0152419 A1 7/2006 Sato et al.
2016/0049719 A1 2/2016 Tseng et al.
(Continued)

FOREIGN PATENT DOCUMENTS

CN 1805215 A 7/2006
CN 103633426 A 3/2014
(Continued)

OTHER PUBLICATIONS

English translation of CN-106450745-B (Year: 2019).*
(Continued)

*Primary Examiner* — Daniel D Chang
(74) *Attorney, Agent, or Firm* — Conley Rose, P.C.

(57) ABSTRACT

An electronic device includes an antenna unit having an antenna body having a feed point and a ground point between a first end and a second end. The antenna body has an operating band with a resonance of a first wavelength. An electrical length of the antenna body from the feed point to the ground point is greater than or equal to ¼ and less than ½ of the first wavelength. An electrical length from the first end to the feed point is greater than or equal to ⅛ and less than or equal to ¼ of the first wavelength. An electrical length from the second end to the ground point is greater
(Continued)

than or equal to ⅛ and less than or equal to ¼ of the first wavelength. The antenna body is adapted to operate in a slot mode and in a wire mode.

20 Claims, 18 Drawing Sheets

(51) Int. Cl.
*H01Q 1/48* (2006.01)
*H01Q 5/50* (2015.01)
*H01Q 9/04* (2006.01)

(58) Field of Classification Search
CPC .......... H01Q 5/364; H01Q 9/42; H01Q 13/10; H01Q 21/30; H01Q 1/22; H01Q 1/36; H01Q 1/50
See application file for complete search history.

(56) References Cited

U.S. PATENT DOCUMENTS

| | | | |
|---|---|---|---|
| 2016/0233574 | A1 | 8/2016 | Xiong et al. |
| 2016/0285153 | A1 | 9/2016 | Li et al. |
| 2016/0336649 | A1 | 11/2016 | Yu et al. |
| 2017/0048363 | A1 | 2/2017 | Lee et al. |
| 2018/0062244 | A1 | 3/2018 | Huang et al. |
| 2018/0069306 | A1 | 3/2018 | Xue et al. |
| 2018/0083343 | A1 | 3/2018 | Choon et al. |
| 2018/0358699 | A1 | 12/2018 | Li et al. |
| 2018/0374290 | A1 | 12/2018 | Bjorkengren |
| 2020/0373669 | A1 | 11/2020 | Xue |
| 2022/0278446 | A1 | 9/2022 | Wang et al. |

FOREIGN PATENT DOCUMENTS

| | | | | | |
|---|---|---|---|---|---|
| CN | 104836031 | A | | 8/2015 | |
| CN | 105161822 | A | | 12/2015 | |
| CN | 106876897 | A | | 6/2017 | |
| CN | 106921032 | A | | 7/2017 | |
| CN | 106953162 | A | | 7/2017 | |
| CN | 106972254 | A | | 7/2017 | |
| CN | 107181045 | A | | 9/2017 | |
| CN | 107508035 | A | | 12/2017 | |
| CN | 107799909 | A | | 3/2018 | |
| CN | 108232419 | A | | 6/2018 | |
| CN | 108270082 | A | | 7/2018 | |
| CN | 108336483 | A | * | 7/2018 | ........... H01Q 1/2258 |
| CN | 108511905 | A | | 9/2018 | |
| CN | 108808221 | A | | 11/2018 | |
| CN | 208157633 | U | | 11/2018 | |
| CN | 109687151 | A | | 4/2019 | |
| CN | 106450745 | B | * | 5/2019 | ............... H01Q 1/24 |
| CN | 109818134 | A | | 5/2019 | |
| CN | 109950701 | A | | 6/2019 | |
| CN | 110416690 | A | | 11/2019 | |
| CN | 110741506 | A | | 1/2020 | |
| CN | 106921024 | B | | 2/2020 | |
| CN | 110832829 | A | | 2/2020 | |
| CN | 112421211 | A | | 2/2021 | |
| EP | 3644441 | A1 | | 4/2020 | |
| WO | 2017128926 | A1 | | 8/2017 | |

OTHER PUBLICATIONS

Xie Jiangling, Design of Wide Stopband Filter with Antenna Front-end, Feb. 2017, 82 pages.

S. Wu, A. Zhao and B. Zhong, "Dual-Band MIMO System Based on Metal Frame for 5G Applications," 2019 IEEE Conference on Antenna Measurements and Applications (CAMA), Kuta, Bali, Indonesia, 2019, 4 pages.

* cited by examiner

ELECTRONIC DEVICE

CROSS-REFERENCE TO RELATED APPLICATIONS

This is a U.S. National Stage of International Patent Application No. PCT/CN2021/090440 filed on Apr. 28, 2021, which claims priority to Chinese Patent Application No. 202010463851.5 filed on May 27, 2020, both of which are hereby incorporated by reference in their entireties.

This application claims priority to Chinese Patent Application No. 202010463851.5, filed with the China National Intellectual Property Administration on May 27, 2020 and entitled "ELECTRONIC DEVICE", which is incorporated herein by reference in its entirety.

TECHNICAL FIELD

This application relates to the field of electronic technologies, and in particular, to an electronic device.

BACKGROUND

With development of a bezel-less screen of an electronic device, space of an antenna is reduced day by day. In addition, a quantity of antennas increases to meet various user requirements. Currently, an antenna unit in an electronic device such as a mobile phone usually uses a conductive bezel to implement communication. That is, a plurality of spaced gaps are configured on the conductive bezel, and a section between adjacent gaps of the conductive bezel may form an antenna body of the antenna unit.

However, holding the electronic device with a hand affects radiation of using the bezel as the antenna unit, causing signal amplitude decrease. In this case, a death grip is easily generated to affect radiation performance of the antenna unit.

SUMMARY

This application provides an electronic device, to resolve impact of signal amplitude decrease caused by holding the electronic device with a hand, and resolve a phenomenon that a frequency of an antenna unit enters an operating frequency band due to a dent frequency offset caused by holding the electronic device with the hand, so that the antenna unit still maintains good radiation performance. This helps improve radiation efficiency of the antenna unit, and makes an electronic device including the antenna unit competitive.

This application provides an electronic device. The electronic device includes a radio frequency front-end and an antenna unit. The antenna unit includes an antenna body, and the antenna body has a feed point and a ground point. The antenna body includes a first end and a second end, no gap is configured on the antenna body, the feed point is configured to connect to the radio frequency front-end, and the ground point is configured to connect to a ground of the electronic device. The antenna body generates a resonance of a first wavelength and a resonance of a second wavelength at work. The first wavelength is greater than the second wavelength, and an electrical length of the antenna body from the feed point to the ground point is greater than or equal to ¼ of the first wavelength and less than ½ of the first wavelength.

According to the electronic device provided in the first aspect, the electrical length of the antenna unit from the teed point to the ground point is adjusted to implement dual-mode coverage of a slot-wire mode and a D mode of the antenna unit, so that the antenna unit can generate, in the slot-wire mode, excitation whose radiation direction is in a thickness direction of the electronic device, and the antenna unit can generate, in the D mode, excitation whose radiation direction is in a direction separately perpendicular to two ends of the antenna unit. When the antenna unit is L-shaped, the direction perpendicular to the two ends of the antenna unit includes: a length direction perpendicular to the electronic device and a width direction perpendicular to the electronic device. When the antenna unit is straight-line-shaped, the direction perpendicular to the two ends of the antenna unit includes: a length direction perpendicular to the electronic device or a width direction perpendicular to the electronic device. Therefore, the antenna unit not only has good radiation performance when the electronic device is in a free space state or a beside head and hand state (including a beside head and hand left state and a beside head and hand right state), but also avoids impact of signal amplitude decrease caused by holding the electronic device with a hand, especially impact on low band (low band, LB) signal transmission, and a phenomenon that a frequency of the antenna unit enters an operating frequency band due to a dent frequency offset caused by holding the electronic device with the hand. This helps improve radiation efficiency of the antenna unit. In addition, dual-mode coverage helps select a mode of the antenna unit corresponding to a parameter such as communication strength, so that the electronic device including the antenna unit can meet various communication requirements.

The antenna body generates a current reverse point at an electrical length from the first end of the antenna body to the feed point of the antenna body, generates a current reverse point at the electrical length from the feed point to the ground point, and generates a current reverse point at an electrical length from the ground point to the second end of the antenna body. Therefore, the antenna body can jointly generate three current reverse points. In this way, the antenna body may generate wire mode excitation of the antenna unit at the electrical length from the first end of the antenna body to the feed point and the electrical length from the ground point to the second end of the antenna body, and may generate slot mode excitation of the antenna unit at the electrical length from the feed point to the ground point, so as to jointly generate a slot-wire mode of the antenna unit. In this way, the antenna unit can excite a resonance of the first wavelength in the slot-wire mode, and the resonance of the first wavelength may excite slot-wire mode excitation whose radiation direction is in a thickness direction of the electronic device. In addition, the antenna body may jointly generate a resonance of the second wavelength of the antenna unit at an electrical length from the first end of the antenna body to the second end of the antenna body. The resonance of the second wavelength may excite D mode excitation in a direction perpendicular to the length direction of the electronic device and the width direction of the electronic device respectively, so that the antenna unit may work in dual modes of the slot-wire mode and the D mode.

In this application, because the radiation direction of the slot-wire mode excitation is different from the radiation direction of the D mode excitation, a problem of mutual integration between the slot-wire mode excitation and the D mode excitation does not occur or has little impact, so that the antenna unit can cover the dual modes of the antenna unit, and the mode of the antenna unit can be flexibly selected based on a communication requirement. In this way, an electronic device including the antenna unit can meet various communication requirements, and further resolves a problem of signal amplitude decrease caused by holding the electronic device with a hand, and a problem that the antenna unit enters an operating frequency band due to a dent frequency offset when the hand holds the electronic device. In this case, the antenna unit still has good radiation performance when the electronic device is in a free space state or a beside head and hand state, thereby avoiding generation of an efficiency dent in a same operating frequency band, improving radiation efficiency of the antenna unit, and making the electronic device including the antenna unit competitive.

The slot-wire mode may be understood as a mode in which both a feature of the slot mode and a feature of the wire mode are integrated. When the mode of the antenna unit is the slot mode, a wider ground of the antenna unit indicates better radiation performance of the antenna unit. Holding the electronic device with a hand is equivalent to widening a ground of the antenna unit. Therefore, the slot mode has a hand-held friendly feature. In this application, a resonance of a first wavelength of the antenna unit may generate slot-wire mode excitation, that is, both the wire mode excitation and the slot mode excitation are generated. Therefore, through generation of the slot mode excitation, the resonance of the first wavelength generated by the antenna unit is slightly affected by hand holding or is not affected by hand holding. In addition, through mutual adjustment of the wire mode excitation and the slot mode excitation, the resonance of the first wavelength generated by the antenna unit may fall within an operating frequency band of the antenna unit.

The D mode may be understood as a mode corresponding to excitation that can be generated by the antenna unit and whose radiation direction is separately perpendicular to two ends of the antenna unit. In this application, a resonance of a second wavelength of the antenna unit may generate D mode excitation, so that the resonance generated by the antenna unit can meet a communication requirement.

The mode excitation refers to different modes generated by the antenna unit after port excitation is added to the antenna unit, and is represented as a distribution of different characteristic currents generated by excitation on a ground of the antenna unit. For example, in this application, the resonance of the first wavelength of the antenna unit generates the slot-wire mode excitation in the thickness direction of the electronic device, that is, a main flow direction of the characteristic current generated by excitation on the ground of the antenna unit is in the thickness direction of the electronic device. In this application, the resonance of the second wavelength of the antenna unit generates D mode excitation, that is, a main flow direction of the characteristic current generated by excitation on the ground of the antenna unit is in a direction perpendicular to the first end of the antenna unit and a direction perpendicular to the second end of the antenna unit. When the first end of the antenna unit is in a width direction of the electronic device, longitudinal-mode excitation is generated. When the first end of the antenna unit is in a length direction of the electronic device, longitudinal-mode excitation is generated.

The free space state is a state in which no object approaches the electronic device.

The beside head and hand left state is a state in which a left hand holds the electronic device and the electronic device is close to a left face.

The beside head and hand right state is a state in which a right hand holds the electronic device and the electronic device is close to a right face.

In a possible design, the electronic device includes a conductive bezel. The conductive bezel includes a first gap and a second gap, and a section that is of the conductive bezel and that is located between the first gap and the second gap forms the antenna body. Therefore, a partial region of the conductive bezel is used as the antenna body of the antenna unit, thereby effectively reducing space occupied by the antenna unit.

In a possible design, the conductive bezel includes a first side and a second side that intersect, and the first side is longer than the second side. The first gap and the second gap are configured on the first side, and at least a part of the first side forms the antenna body. Alternatively, the first gap and the second gap are configured on the second side, and at least a part of the second side forms the antenna body. Alternatively, the first gap is configured on the first side, the second gap is configured on the second side, and at least a part of the first side and at least a part of the second side jointly form the antenna body. Therefore, it is fully considered that different types of electronic devices have bezels of different lengths, and various possibilities are provided for implementing an antenna unit by using a frame antenna.

In a possible design, the electronic device includes an insulation bezel, and the antenna body is disposed close to the insulation bezel. Therefore, an occupied area of the antenna unit is reduced as much as possible, so that the antenna unit is closer to an edge of the electronic device, thereby implementing a better radiation effect.

In a possible design, a difference between a frequency of the resonance of the first wavelength and a frequency of the resonance of the second wavelength is greater than or equal to 50 MHz and less than or equal to 200 MHz. Therefore, a degree of integration between the resonance of the first wavelength and the resonance of the second wavelength is improved, so that the antenna unit can have good radiation performance in both the free space state and the beside head and hand state.

In a possible design, an electrical length of the antenna body from the first end of the antenna body to the feed point is greater than or equal to ⅛ of the first wavelength and less than or equal to ¼ of the first wavelength, and an electrical length of the antenna body from the second end of the antenna body to the ground point is greater than or equal to ⅛ of the first wavelength and less than or equal to ¼ of the first wavelength. Therefore, it is beneficial to adjust the slot mode excitation by using the wire mode excitation, so that a resonance of the first wavelength generated by the antenna unit may fall within an operating frequency band of the antenna unit.

In a possible design, the antenna unit further includes: a first matching component, a first end of the first matching component is connected to a first connection point, the first connection point is located between the first end of the antenna body and the feed point, a second end of the first matching component is grounded, and the first matching component is configured to adjust the electrical length of the antenna body from the first end of the antenna body to the feed point. Therefore, disposing the first matching component may change the electrical length of the antenna body from the first end of the antenna body to the feed point, so that the antenna body can switch in different operating frequency bands, and the antenna body is also applicable to communication in different operating frequency bands.

In a possible design, the first matching component includes: a first switching switch and a plurality of different grounded first tuning elements, a first end of the first switching switch is connected to the first connection point, and a second end of the first switching switch is switched to connect to different first tuning elements, so as to adjust the electrical length of the antenna body from the first end of the antenna body to the feed point. Therefore, an operating frequency generated by a resonance of the antenna body changes, which helps the antenna body cover different operating frequency bands.

In a possible design, the first tuning element is any one of a capacitor, an inductor, or a resistor; or the first tuning element is a plurality of a capacitor, an inductor, and a resistor that are connected in series and/or in parallel.

In a possible design, the antenna unit further includes: a second matching component, a first end of the second matching component is connected to a second connection point, the second connection point is located between the ground point and a second end of the antenna body, a second end of the second matching component is grounded, and the second matching component is configured to adjust the electrical length of the antenna body from the ground point to the second end of the antenna body. Therefore, disposing the second matching component can change the electrical length of the antenna body from the ground point to the second end of the antenna body, so that the antenna body can switch in different operating frequency bands, and the antenna body is also applicable to communication in different operating frequency bands.

In a possible design, the second matching component includes: a second switching switch and a plurality of different grounded second tuning elements, a first end of the second switching switch is connected to the second connection point, and a second end of the second switching switch is switched to connect to different second tuning elements, so as to adjust the electrical length of the antenna body from the ground point to the second end of the antenna body. Therefore, an operating frequency generated by a resonance of the antenna body changes, which helps the antenna body cover different operating frequency bands.

In a possible design, the second tuning element is any one of a capacitor, an inductor, or a resistor; or the second tuning element is a plurality of a capacitor, an inductor, and a resistor that are connected in series and/or in parallel.

In a possible design, a third tuning element is connected between the ground point and a grounding position of the ground point, and the third tuning element is configured to adjust an electrical length of the antenna body. Therefore, the third tuning element is connected between the ground point and the grounding position, so as to change the electrical length of the antenna unit from the first end of the antenna unit to the second end of the antenna unit, and the electrical length of the antenna unit from the feed point to the first end of the antenna unit or the electrical length of the antenna unit from the feed point to the second end of the antenna unit, thereby adjusting an operating frequency generated by a resonance of the antenna unit.

In a possible design, the third tuning element is any one of a capacitor, an inductor, and a resistor; or the third tuning element is a plurality of a capacitor, an inductor, and a resistor that are connected in series and/or in parallel.

DESCRIPTIONS OF REFERENCE NUMERALS

Figure 1:
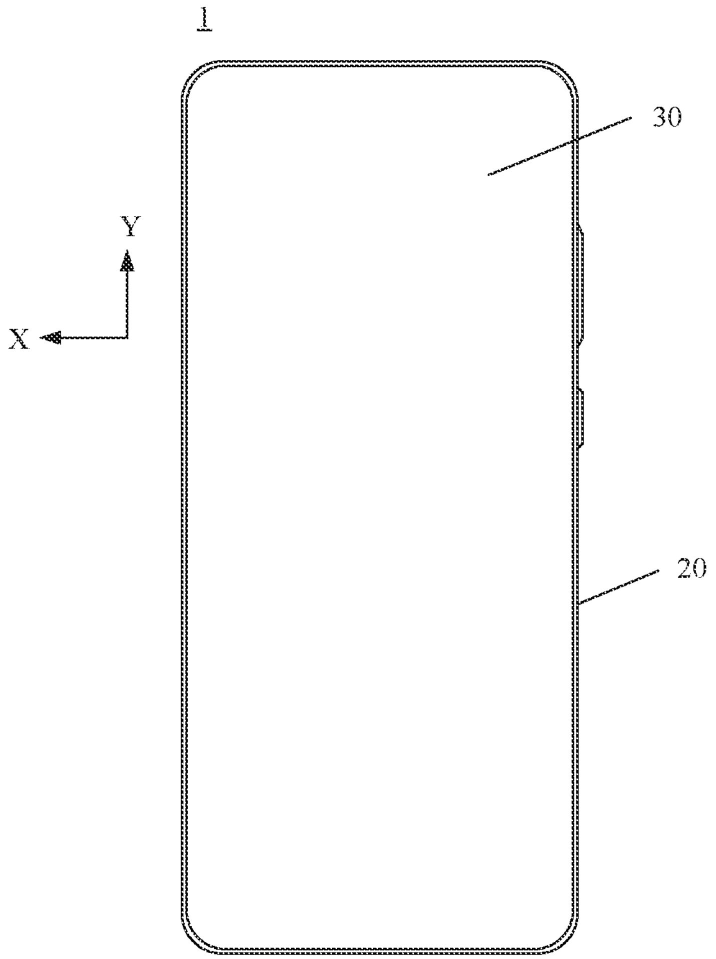
FIG. 1 is a schematic diagram of a structure of an electronic device according to an embodiment of this application.

10-Antenna unit; 11-Antenna body; A1-First end of an antenna body; A2-Second end of an antenna body; 12-Feed point; 13-Ground point; L2-Electrical length of an antenna body from a first end of the antenna body to a feed point; L2-Electrical length of an antenna body from a feed point to a ground point; L3-Electrical length of an antenna body from a ground point to a second end of the antenna body; 14-First matching component; 141-First switching switch; 142-First tuning element; B1-First connection point; 15-Second matching component; 151-Second switching switch; 152-Second tuning element; B2-Second connection point; 16-Third tuning element; C1-First current reverse point; C2-Second current reverse point; C3-Third current reverse point;

1-Electronic device; 20-Bezel; 30-Display; 40-Radio frequency front-end; 50-Printed circuit board; 60-Middle frame; 71-First gap; 72-Second gap; 80-Gap; 91-First spring contact; and 92-Second spring contact.

DESCRIPTION OF EMBODIMENTS

This application provides an antenna unit and an electronic device including the antenna unit. An electrical length of the antenna unit from a feed point to a ground point is adjusted to implement dual-mode coverage of a slot-wire mode and a differential mode (differential mode, D mode) of the antenna unit, so that the antenna unit can generate, in the slot-wire mode, excitation whose radiation direction is in a thickness direction of the electronic device, and the antenna unit can generate, in the D mode, excitation whose radiation direction is in a direction separately perpendicular to two ends of the antenna unit. Therefore, the antenna unit not only has good radiation performance when the electronic device is in a free space (free space, FS) state or a beside head and hand state (including a beside head and hand left state and a beside head and hand right state), but also avoids impact of signal amplitude decrease caused by holding the electronic device with a hand, especially impact on low band (low band, LB) signal transmission, and a phenomenon that a frequency of the antenna unit enters an operating frequency band due to a dent frequency offset caused by holding the electronic device with the hand. This helps improve radiation efficiency of the antenna unit. In addition, dual-mode coverage helps select a mode of the antenna unit corresponding to a parameter such as communication strength, so that the electronic device including the antenna unit can meet various communication requirements.

In some embodiments, a frequency of an LB signal of the antenna unit is usually between 699 MHz and 960 MHz.

A manufacturing process of the antenna unit is not limited in this application. For example, the antenna unit may be manufactured of a flexible circuit board (flexible printed circuit board, FPC), or may be manufactured by using a laser process, or may be manufactured by using a spraying process. A position of the antenna unit in the electronic device is not limited in this application either. For example, the antenna unit may be manufactured by using a metal bezel of an electronic device such as a mobile phone, or may be disposed by using a printed circuit board of the electronic device, or may be disposed on the printed circuit board of the electronic device by using a support. An antenna form of the antenna unit is not limited in this application.

The electronic device mentioned in this application may include but is not limited to a device such as a mobile phone, a headset, a tablet computer, a notebook computer, a wearable device, a pendant device, a cellular phone, a media player, or a data card.

In the following, some terms of this application are described, to help a person skilled in the art have a better understanding.

1. The slot-wire mode may be understood as a mode in which both a feature of a slot mode and a feature of a wire mode are integrated. When the mode of the antenna unit is the slot mode, a wider ground of the antenna unit indicates better radiation performance of the antenna unit. Holding the electronic device with a hand is equivalent to widening a ground of the antenna unit. Therefore, the slot mode has a hand-held friendly feature. In this application, a resonance of a first wavelength of the antenna unit may generate slot-wire mode excitation, that is, both the wire mode excitation and the slot mode excitation are generated. Therefore, through generation of the slot mode excitation, the resonance of the first wavelength generated by the antenna unit is slightly affected by hand holding or is not affected by hand holding. In addition, through mutual adjustment of the wire mode excitation and the slot mode excitation, the resonance of the first wavelength generated by the antenna unit may full within an operating frequency band of the antenna unit.

2. The D mode may be understood as a mode corresponding to excitation that can be generated by the antenna unit and whose radiation direction is separately perpendicular to two ends of the antenna unit. In this application, a resonance of a second wavelength of the antenna unit may generate D mode excitation, so that the resonance generated by the antenna unit can meet a communication requirement.

The mode excitation refers to different modes generated by the antenna unit after port excitation is added to the antenna unit, and is represented as a distribution of different characteristic currents generated by excitation on a ground of the antenna unit. For example, in this application, the resonance of the first wavelength of the antenna unit generates the slot-wire mode excitation in the thickness direction of the electronic device, that is, a main flow direction of the characteristic current generated by excitation on the ground of the antenna unit is in the thickness direction of the electronic device. In this application, the resonance of the second wavelength of the antenna unit generates D mode excitation, that is, a main flow direction of the characteristic current generated by excitation on the ground of the antenna unit is in a direction perpendicular to the first end of the antenna unit and a direction perpendicular to the second end of the antenna unit. When the first end of the antenna unit is in a width direction of the electronic device, longitudinal-mode excitation is generated. When the first end of the antenna unit is in a length direction of the electronic device, longitudinal-mode excitation is generated.

3. The free space state is a state in which no object approaches the electronic device.

4. The beside head and hand left state is a state in which a left hand holds the electronic device and the electronic device is close to a left face.

5. The beside head and hand right state is a state in which a right hand holds the electronic device and the electronic device is close to a right face.

Specific embodiments are used below to describe in detail the technical solutions of this application.

Refer to FIG. 1. An electronic device 1 in this application may include a bezel 20 and a display 30, and the bezel 20 is disposed around the display 30.

The bezel 20 may be a square bezel 20 formed by connecting four sides head to tail. In some embodiments, the bezel 20 has a chamfer, so that the bezel 20 has an aesthetic effect. Lengths of two adjacent sides in the bezel 20 may he equal or unequal. In addition, the bezel 20 may be made of a conductive material such as metal, or a non-conductive material such as plastic or resin.

For ease of description, in FIG. 1, an example in which lengths of two adjacent sides (that is, a first side and a second side) in the bezel 20 of the electronic device 1 are unequal is used for illustration, and the electronic device 1 faces a surface on which the display 30 displays a picture. A relatively long side of the bezel 20 is a length direction of the electronic device 1, and is illustrated by a Y direction. A relatively short side of the bezel 20 is a width direction of the electronic device 1, and is illustrated by an X direction.

The display 30 is configured to display an image, a video, and the like. The display 30 may be a flexible display or a rigid display. For example, the display 30 may be an organic light-emitting diode (organic light-emitting diode, OLED) display, an active-matrix organic light-emitting diode (active-matrix organic light-emitting diode, AMOLED) display, a mini light-emitting diode (mini light-emitting diode) display, a micro light-emitting diode (micro light-emitting diode) display, a micro organic light-emitting diode (micro organic light-emitting diode) display, a quantum dot light-emitting diode (quantum dot light-emitting diode, QSLED) display, or a liquid crystal display (liquid crystal display, LCD).

Figure 2A:
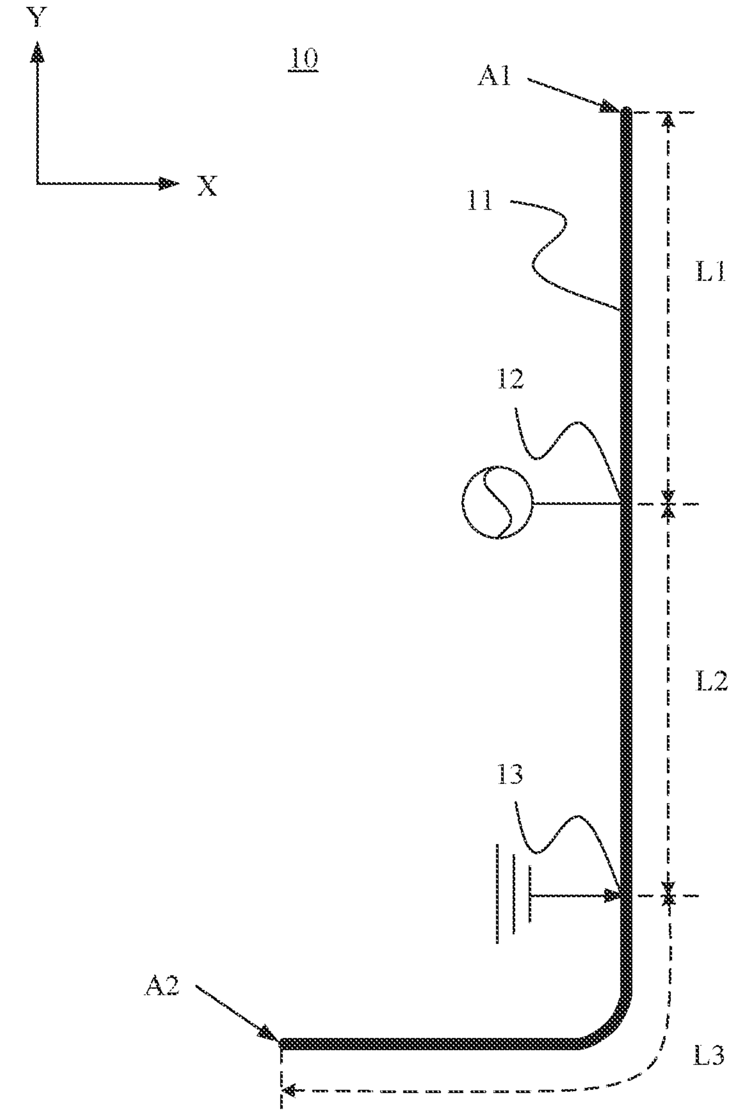
FIG. 2*a* is a schematic diagram of a structure of an antenna unit according to an embodiment of this application.
Figure 2B:
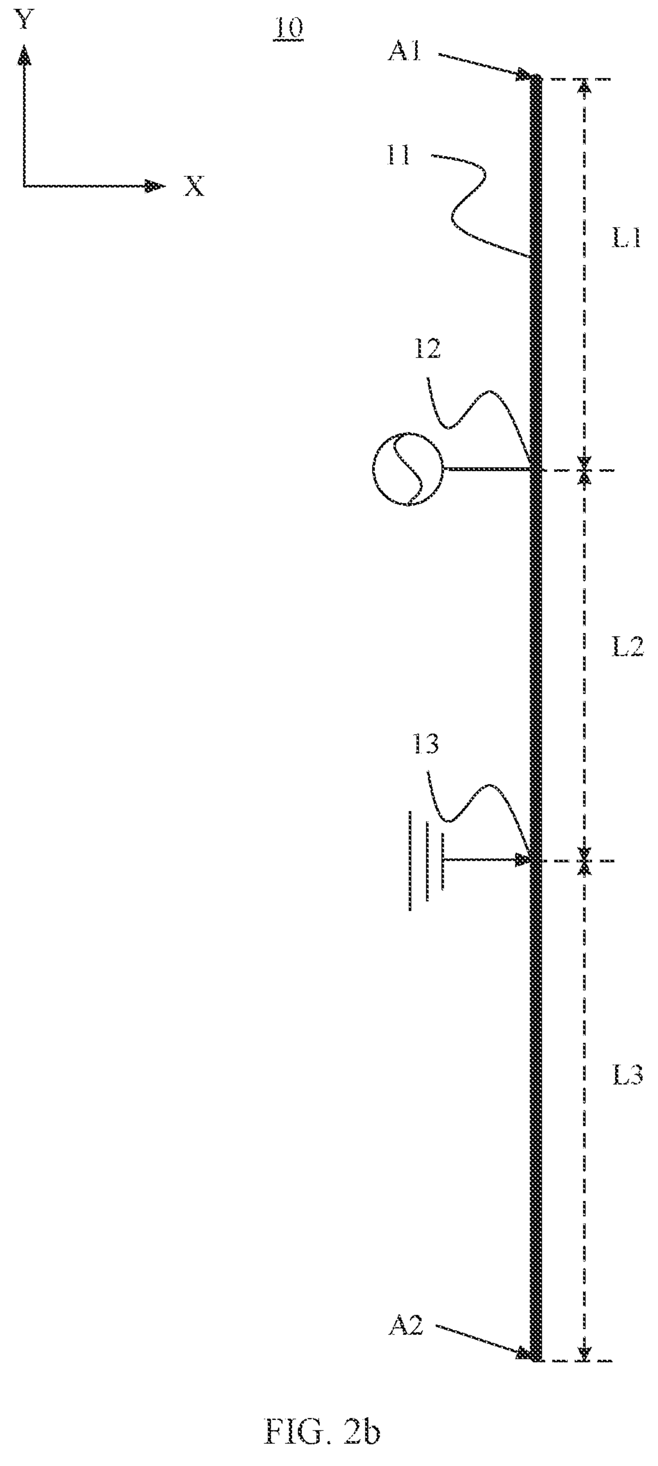
FIG. 2*b* is a schematic diagram of a structure of an antenna unit according to an embodiment of this application.

Refer to FIG. 2*a* and FIG. 2*b*. The electronic device 1 in this application may further include a radio frequency front-end 40, a printed circuit board 50 (not shown in the figure), and at least one antenna unit 10. Each antenna unit 10 may include an antenna body 11. The antenna body 11 has a feed point 12 and a ground point 13.

In this application, the radio frequency front-end 40 is connected to the feed point 12 of the antenna unit 10, the radio frequency front-end 40 is configured to feed a radio frequency signal to the antenna body 11 of the antenna unit 10 or receive a radio frequency signal from the antenna body 11 of the antenna unit 10. In addition, the radio frequency front-end 40, the printed circuit board 50, and the ground point 13 of the antenna unit 10 share a ground.

In some embodiments, the radio frequency front-end 40 includes a transmit channel and a receive channel. The transmit channel includes components such as a power amplifier and a filter. After processing such as power amplification and filtering is performed on a signal by using the components such as the power amplifier and the filter, the signal is transmitted to the antenna unit 10, and is transmitted to the outside by using the antenna unit 10. The receive channel includes components such as a low noise amplifier and a filter. Processing such as low noise amplification and filtering is performed on an outside signal received by the antenna unit 10 by using the components such as the low noise amplifier and the filter, and then the outside signal is transmitted to a radio frequency chip, so that communication between the electronic device 1 and the outside is implemented by using the radio frequency front-end 40 and the antenna unit 10.

In this application, the antenna body 11 may be in a fold line shape (an L shape shown in FIG. 2*a*), a straight line shape shown in FIG. 2*b*, or an irregular shape. This is not limited in this application. In addition, the antenna body 11 may be a metal bezel 20 of the electronic device 1, or may be disposed on the printed circuit hoard 50 in the electronic device 1, or may be disposed on the printed circuit board 50 in the electronic device 1 by using a support.

The feed point 12 is configured to connect to the radio frequency front-end 40 in the electronic device 1, so that a radio frequency signal generated by the radio frequency front-end 40 can be transmitted to the antenna body 11 by using the feed point 12, and is transmitted to the outside by using the antenna body 11, and the antenna body 11 also transmits the radio frequency signal received from the outside to the radio frequency front-end 40 by using the feed point 12. It should be noted that the feed point 12 in this application is not an actual point, and a position at which the radio frequency front-end 40 is connected to the antenna body 11 is the feed point 12.

The ground point 13 is configured to share a ground with the printed circuit board 50 in the electronic device 1, and an electrical length of the antenna body 11 can be adjusted by adjusting a position of the ground point 13. A change of the electrical length can change a frequency on which the antenna body 11 generates a resonance. In an actual application process, the ground point 13 may be grounded by using a ground part such as a ground spring contact or a ground wire. A first end of the ground part is connected to the ground point 13 of the antenna body, and a second end of the ground part is electrically connected to a ground end of the printed circuit board 50. It should be noted that the ground point 13 in this application is not an actual point, and a position at which the ground part such as the ground spring contact or the ground wire is connected to the antenna body is the ground point 13.

The feed point 12 and the ground point 13 are spaced on the antenna body 11. An electrical length of the antenna body 11 from a first end A1 of the antenna body 11 to the feed point 12 is L1. An electrical length of the antenna body 11 from the feed point 12 to the ground point 13 is L2. An electrical length of the antenna body 11 from the ground point 13 to a second end A2 of the antenna body 11 is L3.

It should be noted that positions of the feed point 12 and the ground point 13 may be interchanged. In other words, the feed point 12 is close to the first end A1 of the antenna body 11, and the ground point 13 is close to the second end A2 of the antenna body 11. Alternatively; the ground point 13 is close to the first end A1 of the antenna body 11, and the feed point 12 is close to the second end A2 of the antenna body 11. For ease of description, the feed point 12 and the ground point 13 in this application are illustrated by using positions shown in FIG. 2*a* and FIG. 2*b* as examples.

In addition, an electrical length between any two points on the antenna body 11 may measured in a plurality of manners. For example, in this application, electrical length information of any two points on the antenna body 11 may be measured by using a passive test method. Specifically, the antenna unit 10 is made into a jig, and then two ends (A1 and A2) of the antenna body 11 are respectively sealed with copper sheets. Electrical lengths L1, L2, and L3 can be determined by observing changes of return loss coefficients of the antenna unit 10 measured at different moments.

The electrical length L2 of the antenna body 11 from the feed point 12 to the ground point 13 is set to greater than or equal to ¼ of the first wavelength and less than ½ of the first wavelength. The first wavelenghth is a wavelength of a resonance of the first wavelength formed in a slot-wire mode from the first end A1 of the antenna body 11 to the second end A2 of the antenna body 11.

In some embodiments, the electronic device 1 may further include a middle frame 60. The display 30 and the middle frame 60 are disposed in a stacked manner, and the bezel 20 is disposed around the middle frame 60. The middle frame 60 is made of a conductive material (for example, a metal material) such as metal. The middle frame 60 is grounded, and the middle frame 60 not only may be used as a structural support of the printed circuit board 50, but also may be configured to transfer a spring contact, so that a ground region and the ground point 13 in the electronic device 1 except the printed circuitboard 50 may share a ground with the printed circuit board 50. When the bezel 20 is made of a conductive material, at least a part of the bezel 20 may be electrically connected to the middle frame 60, to implement ground sharing between the bezel 20 and the printed circuit board 50 by using the middle frame 60. It should be noted that the electronic device 1 may alternatively not have a middle frame 60. In this case, the bezel 20 may be connected to another grounding position by using a ground part, to implement ground sharing with the printed circuit board 50.

When the bezel 20 is made of a conductive material, that is, the bezel 20 is a conductive bezel, in this application, some sections of the bezel 20 may be used as the antenna body 11 in the antenna unit 10, to reduce space occupied by the antenna unit 10. The antenna body 11 may be disposed on different sides of the bezel 20. For example, in FIG. 3, an example in which the electronic device 1 is a mobile phone is used, and the electronic device 1 faces a surface that is away from a picture displayed on the display 30. The antenna body 11 in FIG. 2*a* may be disposed on a side and a bottom of the bezel 20. The antenna body 11 may alternatively be disposed on a same side of the bezel 20. For example, in FIG. 4, an example in which the electronic device 1 is a mobile phone is used, and the electronic device 1 faces a surface that is away from a picture displayed on the display 30. The antenna unit 10 in FIG. 2*b* may be disposed on a side of the bezel 20. In FIG. 5, an example in which the electronic device 1 is a tablet computer is used, and the electronic device 1 faces a back surface, that is, a surface away from a picture displayed on the display 30. The antenna unit 10 in FIG. 2*b* may be disposed on a bottom of the bezel 20.

Figure 3:
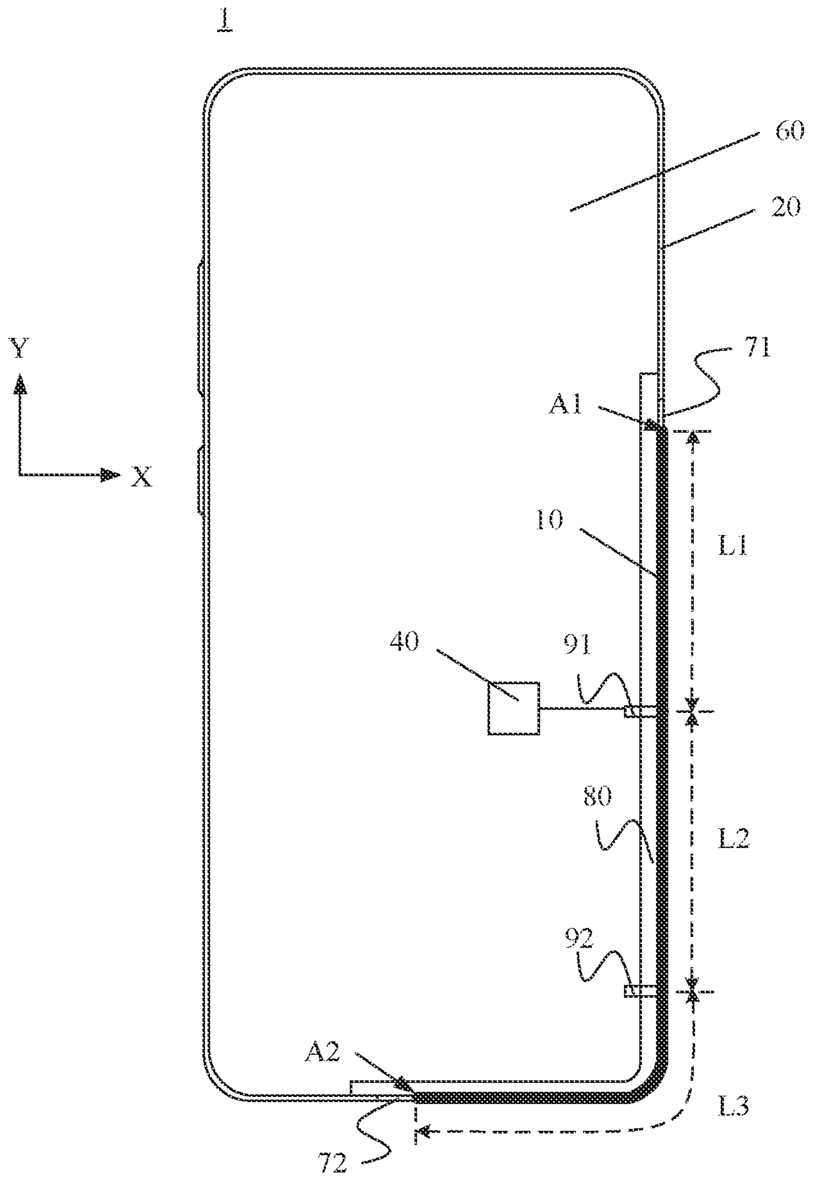
FIG. 3 is a schematic diagram of a structure of an electronic device including the antenna. unit shown in FIG. 2*a* according to an embodiment of this application.
Figure 4:
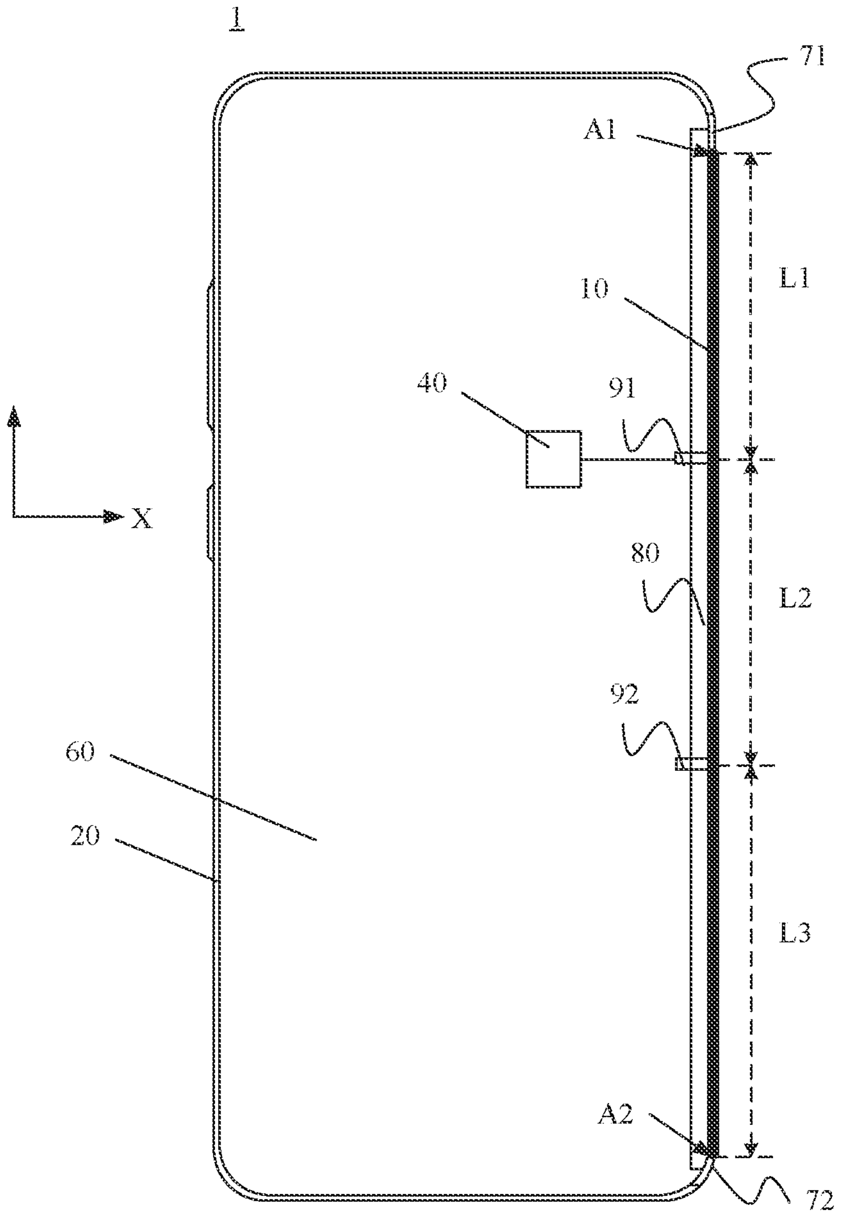
FIG. 4 is a schematic diagram of a structure of an electronic device including the antenna unit shown in FIG. 2*b* according to an embodiment of this application.
Figure 5:
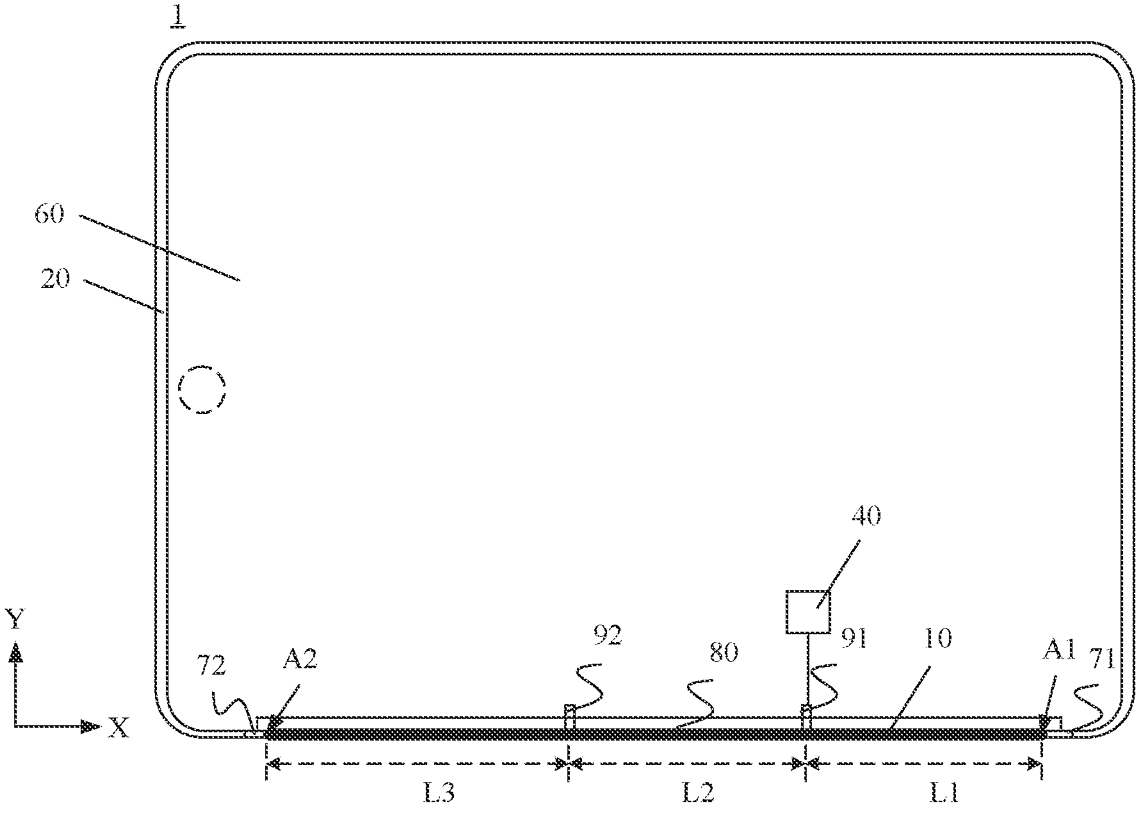
FIG. 5 is a schematic diagram of a structure of an electronic device including the antenna unit shown in FIG. 2*b* according to an embodiment of this application.

In FIG. 3 to FIG. 5, the bezel 20 has a first gap 71 and a second gap 72, so that a gap that is of the bezel 10 and that is located between the first gap 71 and the second gap 72 forms the antenna body 11. In this way, the antenna body 11 is electrically isolated, by using the first gap 71 and the second gap 72, from other sections of the bezel 20 except the antenna body 11, in addition, a gap 80 may be further formed between the antenna body 11 and the middle frame 60, to ensure that the antenna body 11 has good clearance, so that the antenna unit 10 has good radiation performance.

In some embodiments, the first gap 71 and the second gap 72 may be filled with a dielectric material, to further enhance an effect of electrical isolation between the antenna body 11 and another part of the bezel 20 except the antenna body 11.

In addition, in some embodiments, other sections of the bezel 20 except the antenna body 11 may be connected to and integrally formed with the middle frame 60. In some other embodiments, other sections of the bezel 20 except the antenna body 11 may alternatively be used as another antenna body 11 such as a Wi-Fi antenna or a GPS antenna, and a gap 80 also needs to be formed between the another antenna body 11 and the middle frame 60, so as to ensure that the another antenna body 11 has good clearance.

When the bezel 20 is made of a non-conductive material, that is, the bezel 20 is an insulation bezel, the bezel 20 cannot be used as the antenna body 11 in this application. As the antenna needs to be disposed close to an edge of the electronic device 1, in this application, the antenna body 11 may be disposed close to the bezel 20, to reduce an occupied area of the antenna unit 10 as much as possible. in this way, the antenna unit 10 is closer to the edge of the electronic device 1, thereby implementing a better radiation effect. For example, the antenna unit 10 may be an antenna form such as an FPC antenna form, a laser direct structuring laser direct structuring, LDS) antenna form, or a microstrip antenna (microstrip disk antenna, MDA) antenna form.

Figure 6:
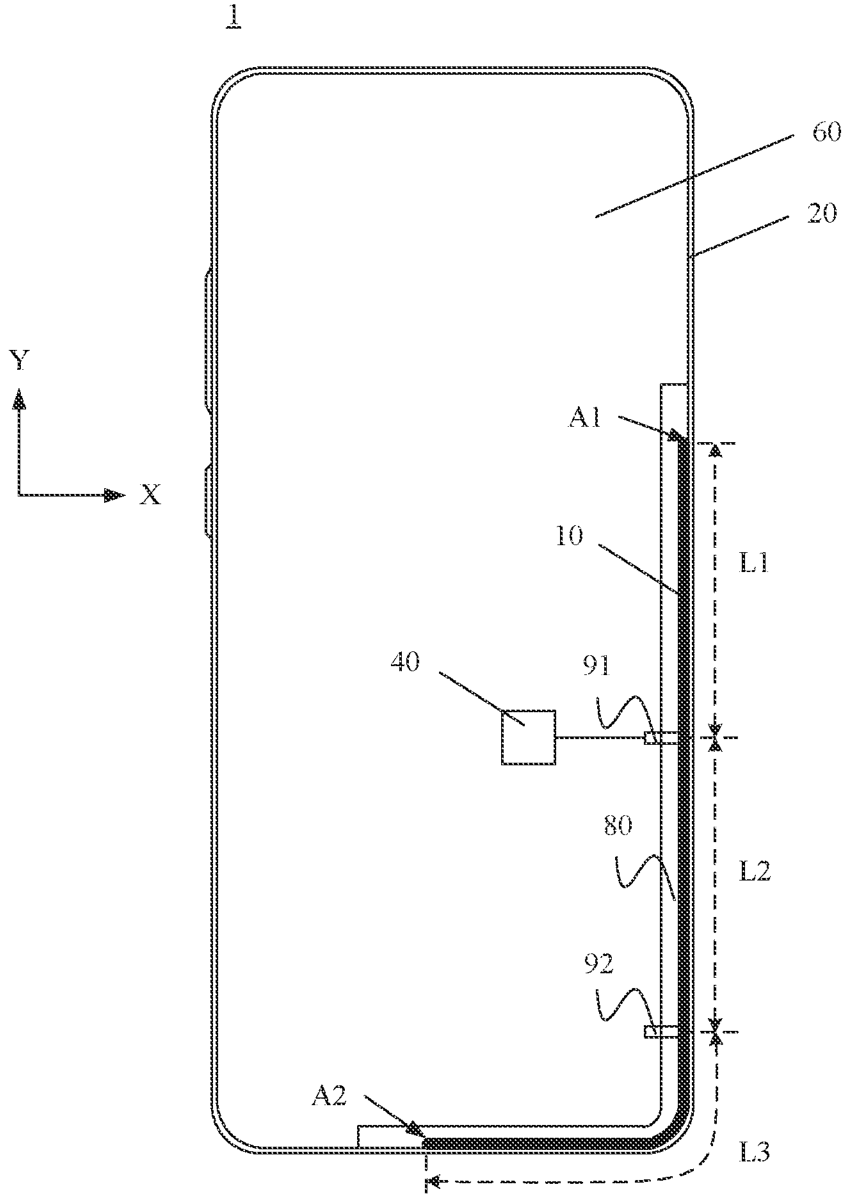
FIG. 6 is a schematic diagram of a structure of an electronic device including the antenna unit shown in FIG. 2*a* according to an embodiment of this application.

It should be noted that, that the antenna body 11 is disposed close to the bezel 20 mentioned herein may be understood as that the antenna body 11 is tightly attached to the bezel 20. For example, in FIG. 6, an example in which the electronic device 1 is a mobile phone is used, and the electronic device 1 faces a back surface, that is, a surface away from a picture displayed on the display 30. The antenna body 11 in FIG. 2*a* may be disposed inside the electronic device 1. In addition, that the antenna body 11 is disposed close to the bezel 20 may alternatively be understood as that the antenna unit 10 is disposed near the bezel 20, that is, there is a specific small gap between the antenna body 11 and the bezel 20. In addition, the first gap 71 and the second gap 72 do not need to be configured on the bezel 20, and a radio frequency signal output or received by the antenna body 11 can still pass through the bezel 20 for radiation. This prevents the bezel 20 from limiting radiation of the antenna unit 10.

In FIG. 3 to FIG. 6, a first end of a first spring contact 91 is connected to the ground point 13, and a second end of the first spring contact 91 is connected to the middle frame 60, so that the ground point 13 is connected to the middle frame 60 by using the second spring contact 92. This implements ground sharing of the antenna unit 10, the middle frame 60, and the printed circuit board 50. A first end of a second spring contact 92 is connected to the feed point 12, and a second end of the second spring contact 92 is connected to the radio frequency front-end 40, so that the feed point 12 is connected to the radio frequency front-end 40 by using the second spring contact 92. This implements bidirectional transmission of a signal between the antenna unit 10 and the radio frequency front-end 40. It should be noted that the antenna body 11 may alternatively be connected to the middle frame 60 by using another structure such as a connection lead, or may be connected to the radio frequency front-end 40 by using another structure such as a connection lead, which is not specifically limited herein.

In this application, when the antenna unit 10 works, a slot mode of the antenna unit 10 may be generated based on a setting that an electrical length L2 of the antenna body 11 from the feed point 12 to the ground point 13 is greater than or equal to ¼ of a first wavelength. In addition, a wire mode of the antenna unit 10 may be generated based on an electrical length L1 of the antenna body 11 from the first end A1 of the antenna body 11 to the feed point 12 and an electrical length L3 of the antenna body 11 from the ground point 13 to the second end A2 of the antenna body 11. In this way, a mode of the antenna unit 10 is changed to the slot-wire mode.

Specific electrical lengths of the electrical length L1 and the electrical length L3 are not limited in this application. In some embodiments, the electrical length L1 is set in a range greater than or equal to ⅛ of the first wavelength and less than or equal to ¼ of the first wavelength. The electrical length L3 is set in a range greater than or equal to ⅛ of the first wavelength and less than or equal to ¼ of the first wavelength. For example, the electrical length L1 is approximately ¼ of the, first wavelength, and the electrical length L3 is approximately ¼ of the first wavelength. Therefore, it is beneficial to adjust slot mode excitation by using wire mode excitation, so that a resonance of the first wavelength generated by the antenna unit 10 may fall within an operating frequency band of the antenna unit 10.

Therefore, the antenna body 11 may jointly generate the resonance of the first wavelength from the first end A1 of the antenna body 11 to the feed point 12, from the ground point 13 to the second end A2 of the antenna body 11, and from the feed point 12 to the ground point 13. The resonance of the first wavelength may excite slot-wire mode excitation whose radiation direction is in a thickness direction of the electronic device 1, so that the electronic device 1 avoids an amplitude decrease problem caused by holding the electronic device 1 with a hand. In this way, the antenna unit 10 still has relatively good antenna radiation performance in a free space state and a beside head and hand state, and avoids a problem that a frequency of the antenna unit 10 enters an operating frequency band due to a dent frequency offset caused by holding the electronic device 1 with the hand, thereby improving radiation efficiency of the antenna unit 10.

The antenna body 11 may generate a resonance of a second wavelength from the first end A of the antenna body 11 to the second end A2 of the antenna body 11. The second wavelength is a wavelength of the resonance of the second wavelength formed from the first end A1 of the antenna body 11 to the second end A2 of the antenna body 11. It should be noted that the resonance of the second wavelength may be a resonance of a half wavelength mode, that is, the antenna body 11 generates a resonance of a ½ second wavelength from the first end A1 of the antenna body 11 to the second end A2 of the antenna body 11. In addition, the resonance of the second wavelength may alternatively be a resonance in another mode. This is not limited in this application.

The first wavelength is greater than the second wavelength, that is, a frequency of the resonance generated from the first end A1 of the antenna body 11 to the feed point 12 is less than a frequency of the resonance generated from the first end A1 of the antenna body 11 to the second end A2 of the antenna body 11, so as to avoid generating an efficiency dent in a same operating frequency band by the resonance of the first wavelength and the resonance of the second wavelength. In this way, the antenna unit 10 can have good radiation performance in the operating frequency band.

It should be noted that the first wavelength and the second wavelength are operating wavelengths of signals whose radiation frequencies are in a same frequency band (for example, a B28 frequency band or a B5 frequency band) in the LTE standard, In other words, the first wavelength or the second wavelength is a wavelength corresponding to any frequency in a radiation frequency band of the antenna unit 10.

When the antenna unit 10 works, based on a setting of an electrical length L1+L2+L3 of the antenna body 11 from the first end A1 of the antenna body 11 to the second end A2 of the antenna body 11, a D mode of the antenna unit 10 may be generated, so that the antenna body 11 generates the resonance of the second wavelength from the first end A1 of the antenna body 11 to the second end A2 of the antenna body 11, and the resonance of the second wavelength may excite relatively strong D mode excitation. Therefore, even when the hand holds the electronic device 1, the D mode excitation is not totally shielded, so that the antenna unit 10 still has relatively good radiation performance in a free space state and a beside head and hand state. This helps select a mode of the antenna unit 10 corresponding to a parameter such as communication strength, so that the electronic device 1 including the antenna unit 10 can meet various communication requirements.

It should be noted that, in some embodiments, when the antenna unit 10 uses an antenna form of a bezel 20 antenna, because the bezels 20 of the electronic device 1 are perpendicular to each other, and the antenna body 11 is either in a straight line shape or in an L shape, when the antenna body 11 is in the straight line shape, the D mode excitation may include transverse mode excitation or longitudinal mode excitation. When the antenna body 11 is in the L shape, the D mode excitation may include transverse mode excitation and longitudinal mode excitation. A direction of the transverse-mode excitation is perpendicular to a length direction of the electronic device 1, and a direction of the longitudinal-mode excitation is perpendicular to a width direction of the electronic device 1. For ease of description, in this application, an example in which a radiation direction of the D mode excitation is separately perpendicular to the length direction of the electronic device 1 and perpendicular to the width direction of the electronic device 1 is used for illustration.

Figure 7A:
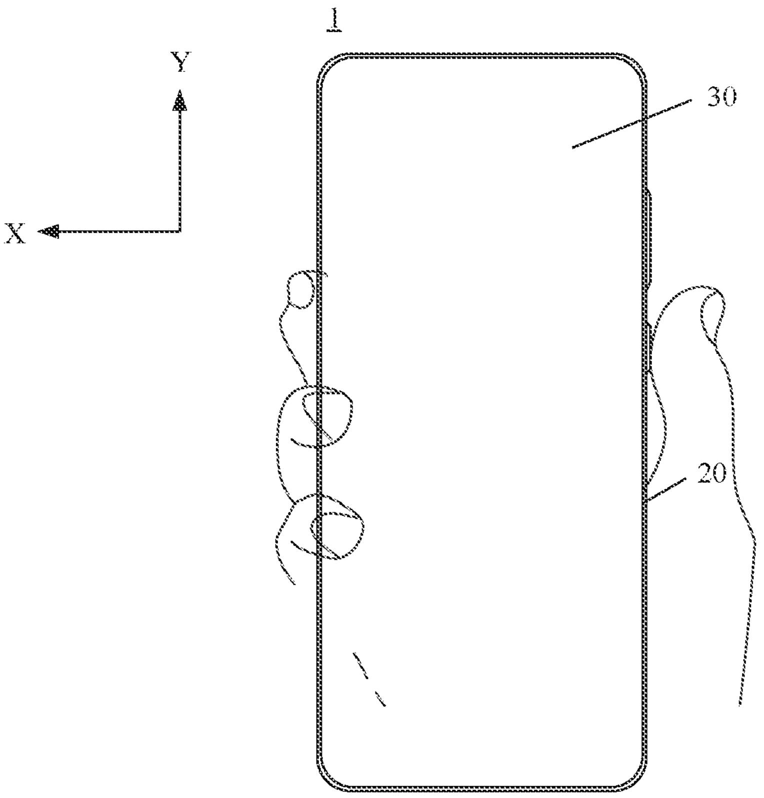
FIG. 7*a* is a schematic diagram of a holding state in which an electronic device is in a portrait mode.

Based on the foregoing description, if holding the electronic device 1 with the hand enables the electronic device 1 to he in a portrait mode, as shown in FIG. 7*a*, the antenna unit 10 may excite slot-wire mode excitation whose radiation direction is in a thickness direction of the electronic device 1, so that even if the hand holds a side of the electronic device 1 strength of the slot-wire mode excitation of the electronic device 1 is not affected, and the antenna unit 10 still has good radiation performance. In addition, the antenna unit 10 may further excite D mode excitation. Therefore, even if the hand holds the side of the electronic device 1, although the strength of the transverse mode excitation of the electronic device 1 is partially affected, strength of the longitudinal mode excitation of the electronic device 1 is not affected, and all D mode excitation cannot be affected, so that the antenna unit 10 still has good radiation performance.

Figure 7B:
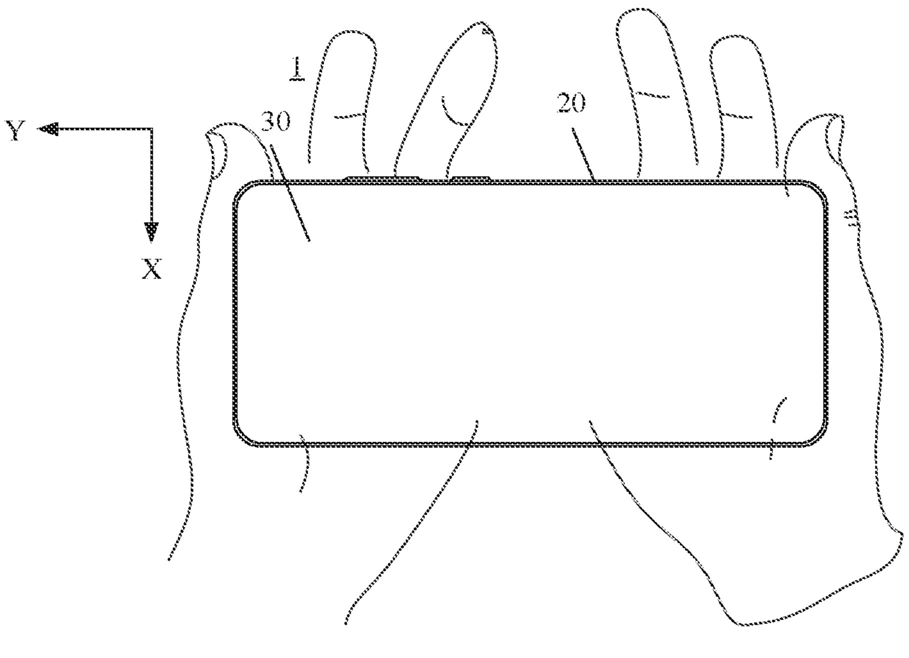
FIG. 7*b* is a schematic diagram of a holding state in which an electronic device is in a landscape mode.

Based on the foregoing description, if holding the electronic device 1 with the hand enables the electronic device 1 to be in a landscape mode, as shown in FIG. 7*b*, the antenna unit 10 may excite slot-wire mode excitation whose radiation direction is in a thickness direction of the electronic device 1, so that even if the hand holds a side of the electronic device 1, strength of the slot-wire mode excitation of the electronic device 1 is not affected, and the antenna unit 10 still has good radiation performance. In addition, the antenna unit 10 may further excite D mode excitation. Therefore, even if the hand holds the side of the electronic device 1, although strength of the longitudinal mode excitation of the electronic device 1 is partially affected, strength of the transverse mode excitation of the electronic device 1 is not affected, and all D mode excitation cannot he affected, so that the antenna unit 10 still has good radiation performance.

Figure 8A:
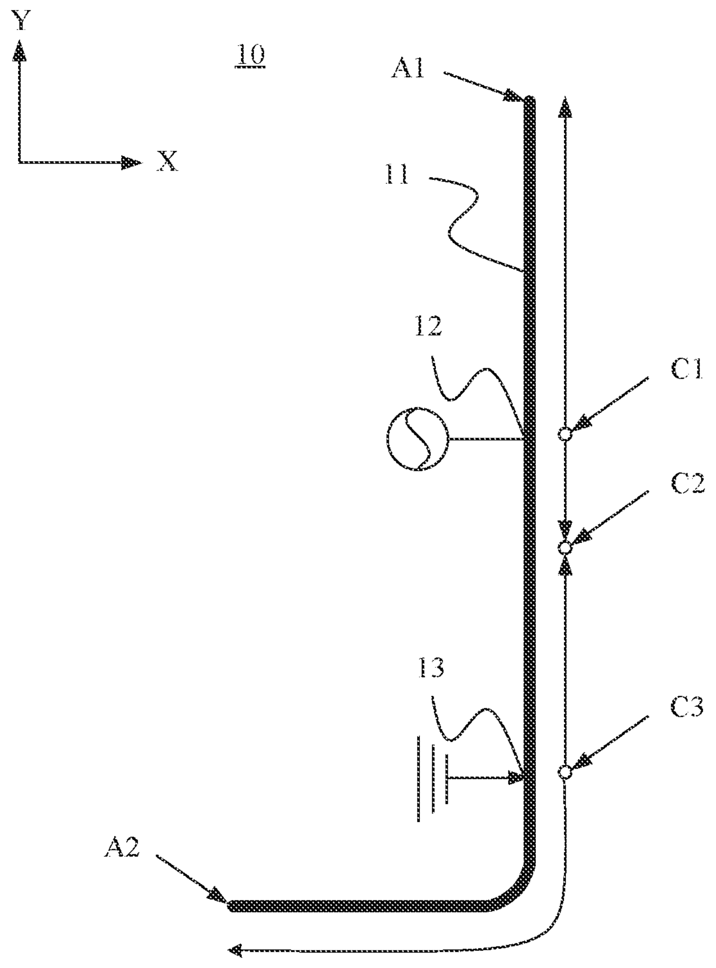
FIG. 8*a* is a current distribution diagram of an antenna unit when an electrical length L2 of an antenna body from a feed point to a ground point is greater than or equal to ¼ of a first wavelength and less than ½ of the first wavelength in FIG. 3.
Figure 8B:
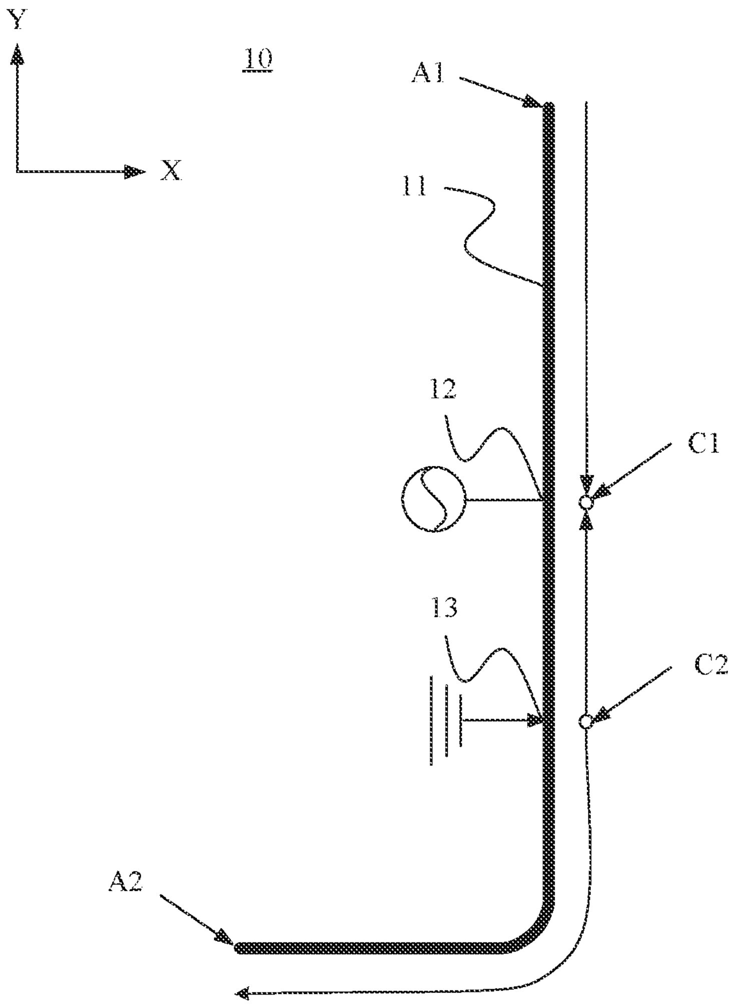
FIG. 8*b* is a current distribution diagram of an antenna unit when an electrical length L2 of an antenna body from a feed point to a ground point is less than ¼ of a first wavelength in FIG. 3.

With reference to FIG. 8*a* and FIG. 8*b*, the following analyzes a working process of the antenna unit 10 from a perspective of a current distribution of the antenna unit 10 by changing an electrical length L2 of the antenna body 11 from the feed point 12 to the ground point 13 in FIG. 3.

Refer to FIG. 8*a*. If the electrical length L2 of the antenna body 11 from the feed point 12 to the ground point 13 is greater than or equal to ¼ of a first wavelength and less than ½ of the first wavelength, when the antenna unit 10 works, three current reverse points: Cl, C2, and C3 are generated on the antenna body 11 (shown by using hollow circles in FIG. 8*a*).

Refer to FIG. 8*b*. If the electrical length L2 of the antenna body 11 from the feed point 12 to the ground point 13 is less than ¼ of the first wavelength, when the antenna unit 10 works, two current reverse points C1 and C2 (shown by using hollow circles in FIG. 8*b*) are generated on the antenna body 11, so that the antenna body 11 can generate a resonance of the ¼ first wavelength, and the resonance of the ¼ first wavelength can excite common mode (common mode, C mode) excitation. The antenna body 11 may also excite a resonance of a second wavelength, and the resonance of the second wavelength may excite D mode excitation, so that the antenna unit 10 may generate C mode excitation and D mode excitation. Although a bandwidth of the antenna unit 10 is expanded, a problem of mutual integration exists between the C mode excitation and the D mode excitation. For example, a same region of the antenna body 11 has different requirements on current distribution. As a result, when a hand holds the electronic device 1, the antenna unit 10 enters an operating frequency band due to a dent frequency offset. This leads to radiation efficiency decrease of the antenna unit 10.

Compared with FIG. 8*a*, the current reverse point C2 added between the feed point 12 and the ground point 13 in FIG. 8*b* is generated due to an increase of the electrical length L2, so that the antenna body 11 in this application generates wire mode excitation of the antenna unit 10 at an electrical length L1 from the first end A1 of the antenna body 11 to the feed point 12 and an electrical length L3 from the ground point 13 to the second end A2 of the antenna body 11, and may generate slot mode excitation of the antenna unit 10 at the electrical length L2 from the feed point 12 to the ground point 13, so as to jointly generate a slot-wire mode of the antenna unit 10. In this way, the antenna unit 10 can excite a resonance of the first wavelength in the slot-wire mode, and the resonance of the first wavelength can excite slot-wire mode excitation whose radiation direction is in a thickness direction of the electronic device 1. In addition, the antenna body 11 may jointly generate a resonance of the second wavelength of the antenna unit 10 at an electrical length L1+L2+L3 from the first end A1 of the antenna body 11 to the second end A2 of the antenna body 11, and the resonance of the second wavelength may excite D mode excitation whose radiation direction is in a direction perpendicular to a length direction and a width direction of the electronic device. In this way, the antenna unit 10 may work in dual modes of a slot mode and a D mode. In this application, because the radiation direction of the slot-wire mode excitation is different from the radiation direction of the D mode excitation, a problem of mutual integration between the slot-wire mode excitation and the D mode excitation does not occur or has little impact, so that the antenna unit 10 can cover the dual modes of the antenna unit, and a mode of the antenna unit 10 can be flexibly selected based on a communication requirement. In this way, the electronic device 1 including the antenna unit 10 can meet various communication requirements, and further resolves a problem of signal amplitude decrease caused by holding the electronic devices with a hand, and a problem that the antenna unit 10 enters an operating frequency band due to a dent frequency offset when the hand holds the electronic device 1. In this case, the antenna unit 10 still has good radiation performance when the electronic device 1 is in a free space state or a beside head and hand state, thereby avoiding generation of an efficiency dent in a same operating frequency band, and improving radiation efficiency of the antenna unit 10.

In some embodiments, a difference between a frequency of the resonance of the first wavelength and a frequency of the resonance of the second wavelength is greater than or equal to 50 MHz and less than or equal to 200 MHz, so that a degree of integration between the resonance of the first wavelength and the resonance of the second wavelength is improved, and the antenna unit 10 can have good radiation performance in both the free space state and the beside head and hand state.

Figure 9:
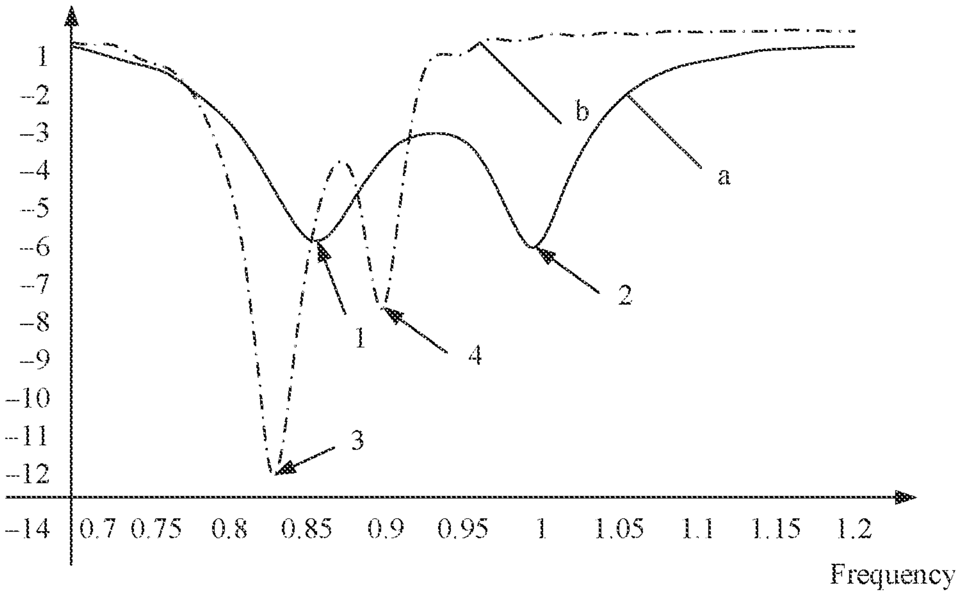
FIG. 9 is a curve diagram of return loss coefficients (S11) of an antenna unit in a same state in two cases: an electrical length L2 of an antenna body from a feed point to a ground point is greater than or equal to ¼ of a first wavelength and less than ½ of the first wavelenghth, and an electrical length L2 of an antenna body from a feed point to a ground point is less than ¼ of the first wavelenghth in FIG. 3.

In the following, with reference to FIG. 9, it is assumed that an operating frequency band of the electronic device 1 in FIG. 3 is a B5 frequency band (that is, within a frequency range of 824 MHz to 894 MHz), a specific implementation process of the antenna unit 10 is analyzed from a perspective of a return loss coefficient (S11) of the antenna unit 10 by changing an electrical length L2 of the antenna body 11 from the feed point 12 to the ground point 13. In FIG. 9, a horizontal coordinate is a frequency in a unit of GHz, and a vertical coordinate is a return loss coefficient (S11) in a unit of dB. A curve a represents the return loss coefficient (S11) of the antenna unit 10 in this application when the electrical length L2 of the antenna body 11 from the feed point 12 to the ground point 13 is greater than or equal to ¼ of the first wavelength and less than ½ of the first wavelength, and a curve b represents the return loss coefficient (S11) of the antenna unit 10 when the electrical length L2 of the antenna body 11 from the feed point 12 to the ground point 13 is less than ¼ of the first wavelength, Refer to FIG. 9. The curve a includes two resonance points: a resonance point 1 and a resonance point 2. A frequency value of the resonance point 1 is 0.8565 GHz, and a return loss coefficient (S11) of the resonance point 1 is −5.6347 dB. A frequency value of the resonance point 2 is 0.99577 GHz, and a return loss coefficient (S11) of the resonance point 2 is −5.8297 dB. The curve b includes a resonance point 3 and a resonance point 4. A frequency value of the resonance point 3 is 0.8293 GHz, and a return loss coefficient (S11) of the resonance point 3 is −11.785 dB. A frequency value of the resonance point 4 is 0.89857 GHz, and a return loss coefficient (S11) of the resonance point 4 is −7.3853 dB.

It can be learned that both the resonance point 1 and the resonance point 2 are in the B5 frequency band, the antenna unit 10 corresponding to the curve a has two modes of the antenna unit 10, and a frequency difference between the resonance point 1 and the resonance point 2 meets a communication requirement of the electronic device 1. Because a frequency difference between the resonance point 3 and the resonance point 4 is less than the frequency difference between the resonance point 1 and the resonance point 2, when the antenna unit 10 corresponding to the curve a just meets the communication requirement of the electronic device 1, the antenna unit 10 corresponding to the curve h cannot meet the communication requirement of the electronic device 1. Therefore, compared with the antenna unit 10 corresponding to the curve b, the antenna unit 10 corresponding to the curve a has better radiation performance.

Figure 10:
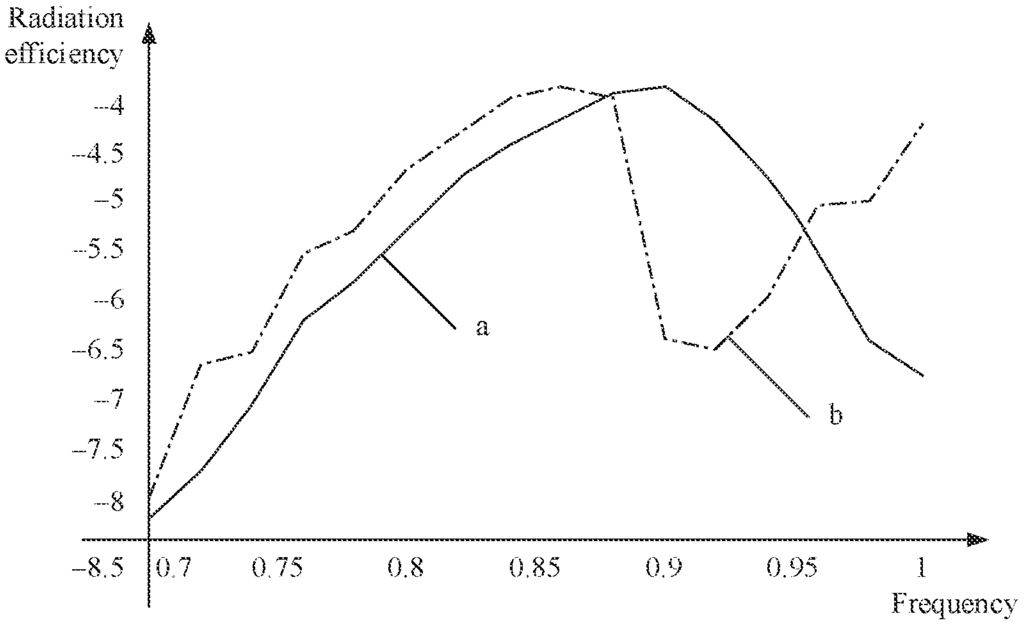
FIG. 10 is radiation efficiency diagram of an antenna unit in a free space state in two cases: an electrical length L2 of an antenna body from a feed point to a ground point is greater than or equal to ¼ of a first wavelength and less than ½ of the first wavelength, and an electrical length L2 of an antenna body from a feed point to a ground point is less than ¼ of the first wavelength in FIG. 3.

In the following, with reference to FIG. 10, it is assumed that an operating frequency band of the electronic device 1 in FIG. 3 is a B5 frequency band (that is, within a frequency range of 824 MHz to 894 MHz), and a working process of the antenna unit 10 is analyzed from a perspective of radiation efficiency of the antenna unit 10 in a free space state by changing an electrical length L2 of the antenna body 11 from the feed point 12 to the ground point 13. In FIG. 10, a horizontal coordinate is a frequency in a unit of GHz, and a vertical coordinate is radiation efficiency in a unit of dB. A curve a represents the radiation efficiency of the antenna unit 10 in this application in the free space state when the electrical length L2 of the antenna body 11 from the feed point 12 to the ground point 13 is greater than or equal to ¼ of the first wavelength and less than ½ of the first wavelength, and a curve b represents the radiation efficiency of the antenna unit 10 in the free space state when the electrical length L2 of the antenna body 11 from the feed point 12 to the ground point 13 is less than ¼ of the first wavelength.

Refer to FIG. 10, Radiation efficiency of the antenna unit 10 corresponding to the curve a and radiation efficiency of the antenna unit 10 corresponding to the curve b in the free space state in the B5 frequency band are basically the same. Therefore, the antenna unit 10 in this application can meet a communication requirement of the electronic device 1.

Figure 11:
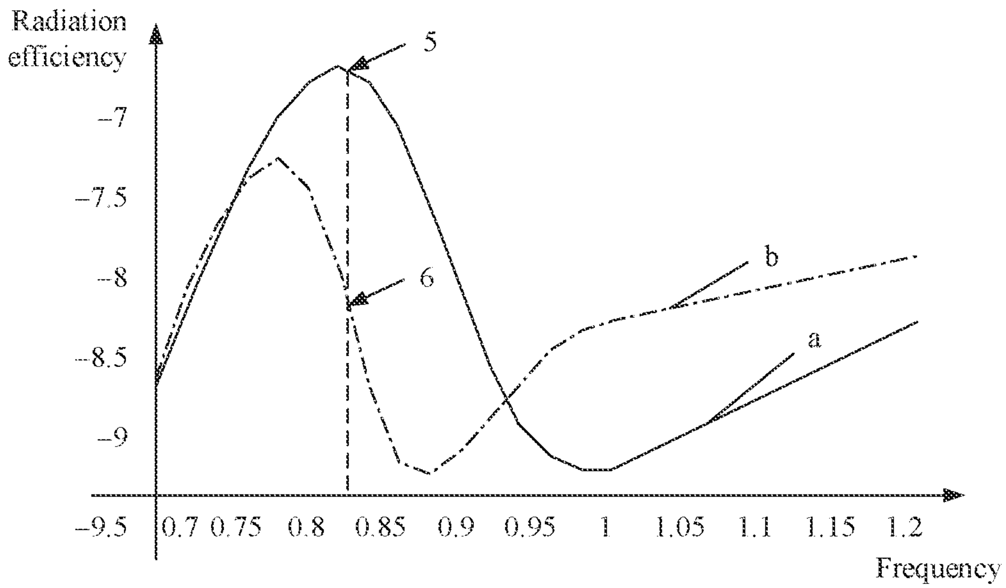
FIG. 11 is radiation efficiency diagram of an antenna unit in a beside head and hand left state in two cases: an electrical length L2 of an antenna body from a feed point to a ground point is greater than or equal to ¼ of a first wavelength and less than ½ of the first wavelength, and an electrical length L2 of an antenna body from a feed point to a ground point is less than ¼ of the first wavelength in FIG. 3.

In the following, with reference to FIG. 11, it is assumed that an operating frequency band of the electronic device 1 in FIG. 3 is a B5 frequency band (that is, within a frequency range of 824 MHz to 894 MHz), and a working process of the antenna unit 10 is analyzed from a perspective of radiation efficiency of the antenna unit 10 in a beside head and hand right state by changing an electrical length L2 of the antenna body 11 from the feed point 12 to the ground point 13. In FIG. 11, a horizontal coordinate is a frequency in a unit of GHz, and a vertical coordinate is radiation efficiency in a unit of dB. A curve a represents the radiation efficiency of the antenna unit 10 in this application in the beside head and hand right state when the electrical length L2 of the antenna body 11 from the feed point 12 to the ground point 13 is greater than or equal to ¼ of the first wavelength and less than ½ of the first wavelength, and a curve b represents the radiation efficiency of the antenna unit 10 in the beside head and hand right state when the electrical length L2 of the antenna body 11 from the feed point 12 to the ground point 13 is less than ¼ of the first wavelength.

Refer to FIG. 11. The resonance point 1 and the resonance point 2 in the curve a basically fall outside the B5 frequency band, and the resonance point 3 and the resonance point 4 in the curve h frill within the B5 frequency band. Compared with mode extrusion between the C mode and the D mode of the antenna unit 10 corresponding to the curve b, mode extrusion impact between the slot-wire mode and the D mode of the antenna unit 10 corresponding to the curve a is relatively small. The resonance point 1, the resonance point 2, the resonance point 3, and the resonance point 4 are not illustrated in FIG. 11. Refer to content described in FIG. 9. Details are not described herein again.

In addition, radiation efficiency of a resonance point 5 whose frequency value is 0.82665 GHz in the curve a is −6.7036 dB. Radiation efficiency of a resonance point 6 whose frequency value is 0.82652 GHz in the curve b is −8.1978 dB. Frequency values of the resonance point 5 and the resonance point 6 are approximately the same. Compared with the curve b, radiation efficiency of the antenna unit 10 corresponding to the curve a is improved by about 2 dB.

Figure 12:
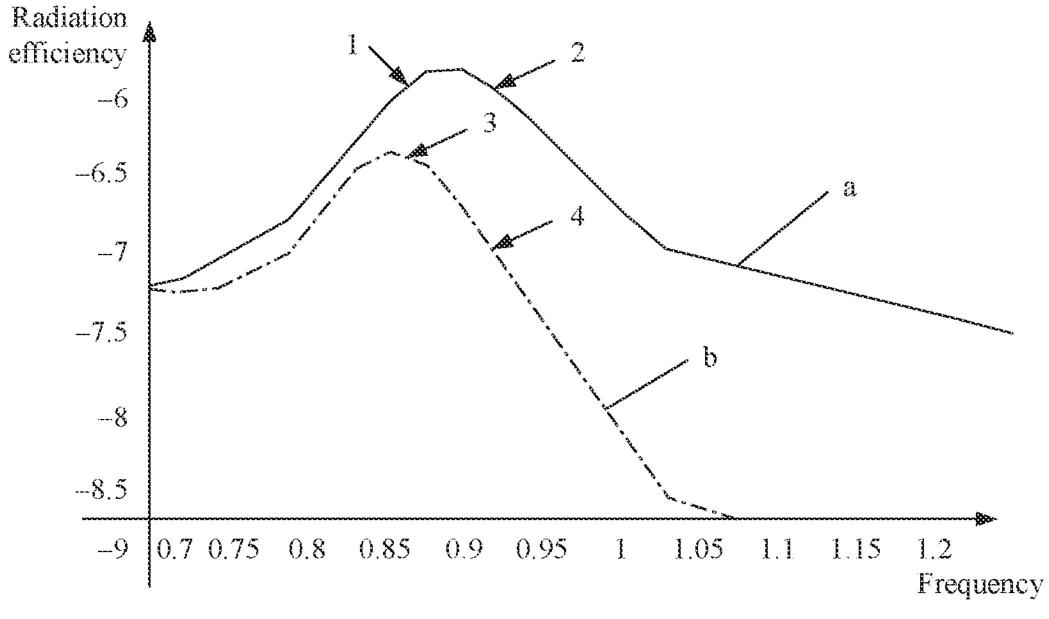
FIG. 12 is a radiation diagram of an antenna unit in a beside head and hand right state in two cases: an electrical length L2 of an antenna body from a feed point to a ground point is greater than or equal to ¼ of a first wavelength and less than ½ of the first wavelength, and an electrical length L2 of an antenna body from a feed point to a ground point is less than ¼ of the first wavelength in FIG. 3.

In the following, with reference to FIG. 12. it is assumed that an operating frequency band of the electronic device 1 in FIG. 3 is a B5 frequency band (that is, within a frequency range of 824 MHz to 894 MHz), and a working process of the antenna unit 10 is analyzed from a perspective of radiation efficiency of the antenna unit 10 in a beside head and hand left state by changing an electrical length L2 of the antenna body 11 from the feed point 12 to the ground point 13. In FIG. 12, a horizontal coordinate is a frequency in a unit of GHz, and a vertical coordinate is radiation efficiency in a unit of dB. A curve a represents the radiation efficiency of the antenna unit 10 in this application in the beside head and hand left state when the electrical length L2 of the antenna body 11 from the feed point 12 to the ground point 13 is greater than or equal to ¼ of the first wavelength and less than ½ of the first wavelength, and a curve b represents the radiation efficiency of the antenna unit 10 in the beside head and hand left state when the electrical length L2 of the antenna body 11 from the feed point 12 to the ground point 13 is less than ¼ of the first wavelength.

Refer to FIG. 12. A curve a includes two resonance points: a resonance point 1 and a resonance point 2. A frequency value of the resonance point 1 is 0.84934 GHz, and radiation efficiency of the resonance point 1 is −5.9182 dB. A frequency value of the resonance point 2 is 0.9 GHz, and radiation efficiency of the resonance point 2 is −5.9457 dB. Both the resonance point 1 and the resonance point 2 are in the B5 frequency band. A curve b includes a resonance point 3 and a resonance point 4. A frequency value of the resonance point 3 is 0.84949 GHz, and radiation efficiency of the resonance point 3 is −6.3788 dB. A frequency value of the resonance point 4 is 0.9 GHz, and radiation efficiency of the resonance point 4 is −6.9483 dB. The resonance point 1 and the resonance point 2 in the curve a basically fall outside the B5 frequency band, and the resonance point 3 and the resonance point 4 in the curve b fall within the B5 frequency band. Compared with the curve b, mode extrusion impact between the slot-wire mode and the D mode of the antenna unit 10 corresponding to the curve a is relatively small.

Figure 13:
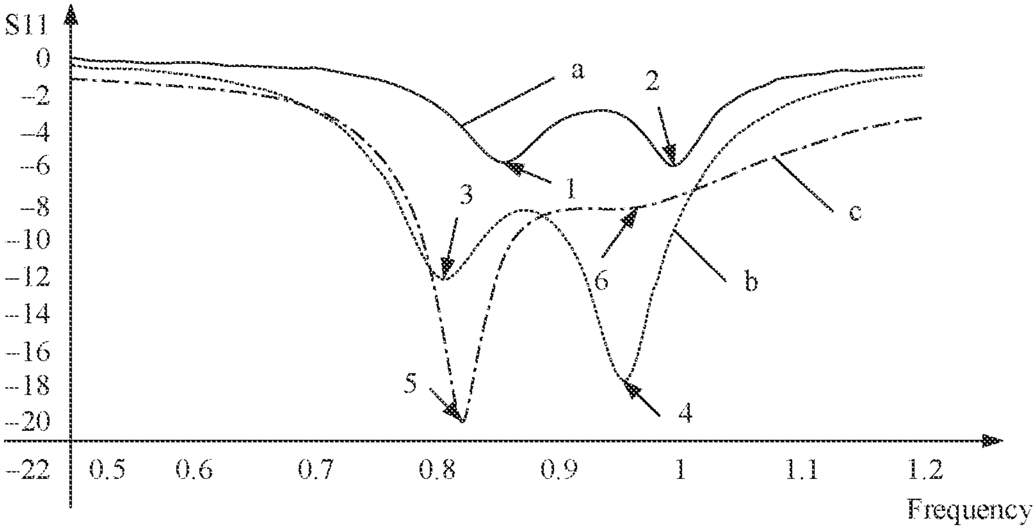
FIG. 13 is a curve diagram of return loss coefficients (S11) of an antenna unit in a free space state, a beside head and hand left state, and a beside head and hand right state when an electrical length L2 of an antenna body from a feed point to a ground point is greater than or equal to ¼ of a first wavelength and less than ½ of the first wavelength in FIG. 3.
Figure 14:
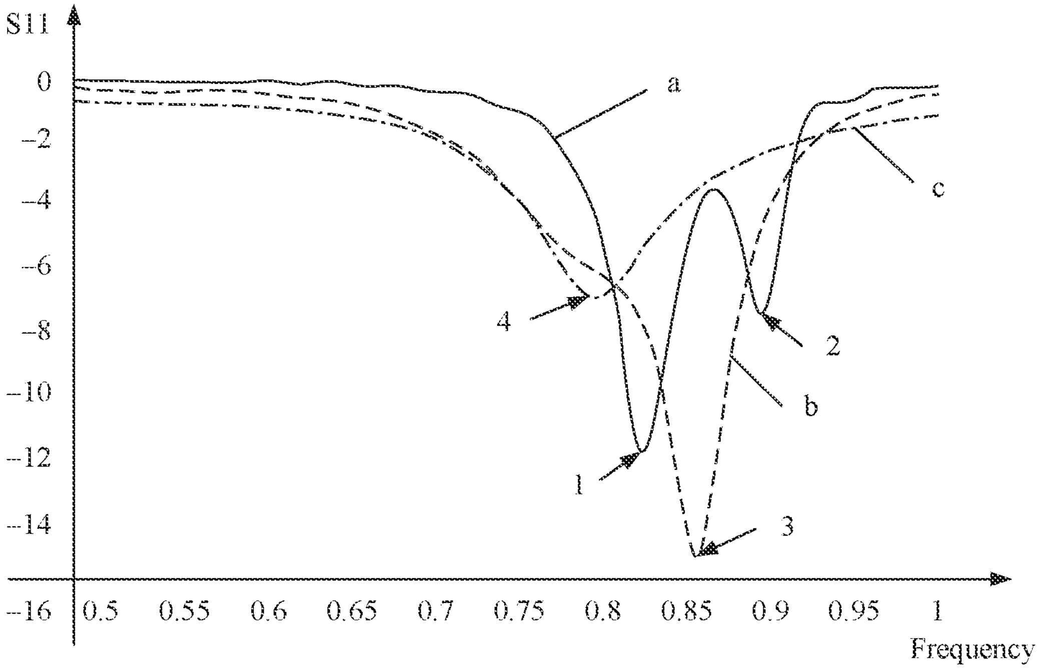
FIG. 14 is a curve diagram of return loss coefficients (S11) of an antenna unit in a free space state, a beside head and hand left state, and a beside head and hand right state when an electrical length L2 of an antenna body from a feed point to a ground point is less than ¼ of a first wavelength in FIG. 3.

With reference to FIG. 13 and FIG. 14, it is assumed that an operating frequency band of the electronic device 1 in FIG. 3 is a B5 frequency band (that is, within a frequency range of 824 MHz to 894 MHz). By changing an electrical length L2 of the antenna body 11 from the feed point 12 to the ground point 13. a working process of the antenna unit 10 is analyzed from a perspective of return loss coefficients (S11) of the antenna unit 10 in a free space state, a beside head and hand left state, and a beside head and hand right state respectively. In FIG. 13 and FIG. 14, a horizontal coordinate is a frequency in a unit of GHz, and a vertical coordinate is radiation efficiency in a unit of dB.

In FIG. 13, a curve a represents the return loss coefficient (S11) of the antenna unit 10 in this application in the free space state when the electrical length L2 of the antenna body 11 from the feed point 12 to the ground point 13 is greater than or equal to ¼ of the first wavelength and less than ½ of the first wavelength, the curve b represents the return loss coefficient (S11) of the antenna unit 10 in the beside head and hand right state of this application when the electrical length L2 of the antenna body 11 from the feed point 12 to the ground point 13 is greater than or equal to ¼ of the first wavelength and less than ½ of the first wavelength, the curve c represents the return loss coefficient (S11) of the antenna unit 10 in the beside hand head left state in this application when the electrical length L2 of the antenna body 11 from the feed point 12 to the ground point 13 is greater than or equal to ¼ of the first wavelength and less than ½ of the first wavelength. In FIG. 14, a curve a represents the return loss coefficient (S11) of the antenna unit 10 in the free space state when the electrical length L2 of the antenna body 11 from the feed point 12 to the ground point 13 is less than ¼ of the first wavelength, and a curve h represents the return loss coefficient (S11) of the antenna. unit 10 in the beside hand head right state when the electrical length L2 of the antenna body 11 from the feed point 12 to the ground point 13 is less than ¼ of the first wavelength, the curve c represents the return loss coefficient (S11) of the antenna unit 10 in the beside hand head left state when the electrical length L2 of the antenna body 11 from the feed point 12 to the ground point 13 is less than ¼ of the first wavelength.

Refer to FIG. 13. A curve a includes two resonance points: a resonance point 1 and a resonance point 2. A frequency value of the resonance point 1 is 0.85625 GHz, and a return loss coefficient (S11) of the resonance point 1 is −5.73 dB. A frequency value of the resonance point 2 is 0.99577 GHz, and a return loss coefficient (S11) of the resonance point 2 is −5.8297 dB. By comparing the frequency values of the resonance point 1 and the resonance point 2, it can be learned that, when the antenna unit 10 corresponding to the curve a is in the free space state, hand holding impact between the slot-wire mode and the D mode is relatively small, and a frequency offset of the electronic device 1 in the B5 frequency band may be controlled to be about 50 MHz, so that a communication requirement of the electronic device 1 is met. A curve b includes two resonance points: a resonance point 3 and a resonance point 4. A frequency value of the resonance point 3 is 0.809375 GHz, and a return loss coefficient (S11) of the resonance point 1 is −12.12 dB. A frequency value of the resonance point 4 is 0.95338 GHz, and a return loss coefficient (S11) of the resonance point 1 is −17.621 dB. By comparing the frequency values of the resonance point 3 and the resonance point 4, it can be learned that, when the antenna unit 10 corresponding to the curve b is in the beside head and hand left state, hand holding impact between the slot-wire mode and the D mode is relatively small, and the frequency offset of the electronic device 1 in the B5 frequency band is controlled to be about 50 MHz, so that a communication requirement of the electronic device 1 is met. A curve c includes two resonance points: a resonance point 5 and a resonance point 6. A frequency value of the resonance point 5 is 0.821875 GHz, and a return loss coefficient (S11) of the resonance point 5 is −19.85 dB. A frequency value of the resonance point 6 is 0.96624 GHz, and a return loss coefficient (S11) of the resonance point 6 is −8.1426 dB. By comparing the frequency values of the resonance point 5 and the resonance point 6, it can be learned that, when the antenna unit 10 corresponding to the curve c is in the beside head and hand right state, hand holding impact between the slot-wire mode and the D mode is relatively small, and the frequency offset of the electronic device 1 in the B5 frequency band is controlled to be about 50 MHz, so that a communication requirement of the electronic device 1 is met.

It should be noted that, generally, a curve of the return loss coefficient (S11) and the frequency is dented at a resonance point, and the return loss coefficient (S11) of the resonance point is usually less than or equal to −5 dB. In addition, if a denting degree of the curve at the resonance point is not obvious, for example, the resonance point 6 on the curve c shown in FIG. 13, in this application, an electrical length of the antenna body 11 may be adjusted by using a tuning element, so as to increase the denting degree of the resonance point. In this way, radiation performance of the antenna body 11 is improved. The denting degree of the curve at the resonance point is not limited in this application, provided that it is ensured that the curve is dented at the resonance point.

Refer to FIG. 14. A curve a includes two resonance points: a resonance point 1 and a resonance point 2. A frequency value of the resonance point 1 is 0.82802 GHz, and a return loss coefficient (S11) of the resonance point 1 is −11.794 dB. A frequency value of the resonance point 2 is 0.89729 GHz, and a return loss coefficient (S11) of the resonance point 2 is −7.4352 dB. By comparing the frequency values of the resonance point 1 and the resonance point 2, it can be learned that, when the antenna unit 10 corresponding to the curve a is in the free space state, hand holding impact between the C mode and the D mode is relatively large, and a frequency offset of the electronic device 1 in the B5 frequency band is relatively large, so that a communication requirement of the electronic device 1 cannot be met. A curve b includes a resonance point 3. A frequency value of the resonance point 3 is 0.86053 GHz, and a return loss coefficient (S11) of the resonance point 3 is −15.011 dB. Because only the resonance point 3 exists in the curve a, it can be learned that, hand holding impact between the C mode and the D mode of the antenna unit 10 corresponding to the curve b in the beside head and hand left state is relatively large, and the frequency offset of the electronic device 1 disappears in the B5 frequency band. As a result, a communication requirement of the electronic device 1 cannot be met, and radiation efficiency dent easily occurs. A curve c includes a resonance point 4. A frequency value of the resonance point 4 is 0.79857 GHz, and a return loss coefficient (S11) of the resonance point 4 is −68723 dB. Because only the resonance point 4 exists in the curve c, it can be learned that, hand holding impact between the C mode and the D mode of the antenna unit 10 corresponding to the curve c in the beside head and hand right state is relatively large, and the frequency offset of the electronic device 1 disappears in the B5 frequency band. As a result, a communication requirement of the electronic device 1 cannot be met, and radiation efficiency dent easily occurs.

In the following, with reference to FIG. 15, it is assumed that an operating frequency band of the electronic device 1 in FIG. 3 is a B5 frequency band (that is, within a frequency range of 824 MHz to 894 MHz), and when the antenna unit 10 works in the D mode, a working process of the antenna unit 10 is analyzed from perspectives of a radiation pattern and an instantaneous current of the antenna unit 10 by changing an electrical length L2 of the antenna body 11 from the feed point 12 to the ground point 13.

Figure 15:
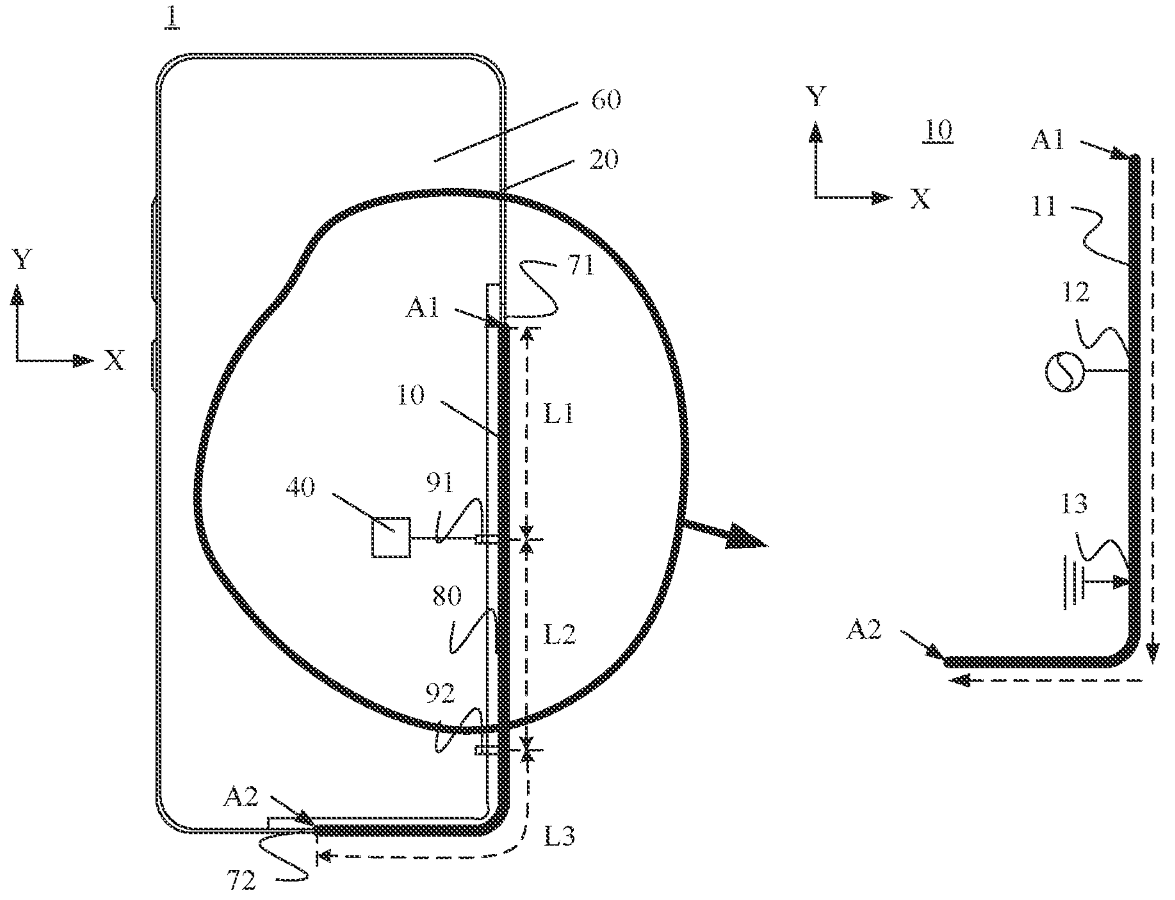
FIG. 15 is a radiation pattern and a current transient schematic diagram of an antenna unit in two cases: an electrical length L2 of an antenna body from a feed point to a ground point is greater than or equal to ¼ of a first wavelength and less than ½ of the first wavelength, and an electrical length L2 of an antenna body from a feed point to a ground point is less than ¼ of the first wavelength in FIG. 3.

In FIG. 15, when the electrical length L2 of the antenna body 11 from the feed point 12 to the ground point 13 changes from being less than ½ of a first wavelength to being greater than or equal to ¼ of the first wavelength and less than ½ of the first wavelength, a maximum radiation direction of the antenna unit 10 basically remains unchanged, that is, a direction pointed to by a bold arrow.

In the following, with reference to FIG. 16*a*, FIG. 16*b* and FIG. 17, it is assumed that an operating frequency band of the electronic device 1 in FIG. 3 is a B5 frequency band (that is, within a frequency range of 824 MHz to 894 MHz), and when the antenna unit 10 works in a slot-wire mode, a working process of the antenna unit 10 is analyzed from perspectives of a radiation pattern and an instantaneous current of the antenna unit 10 by changing an electrical length L2 of the antenna body 11 from the feed point 12 to the ground point 13.

Figure 16A:
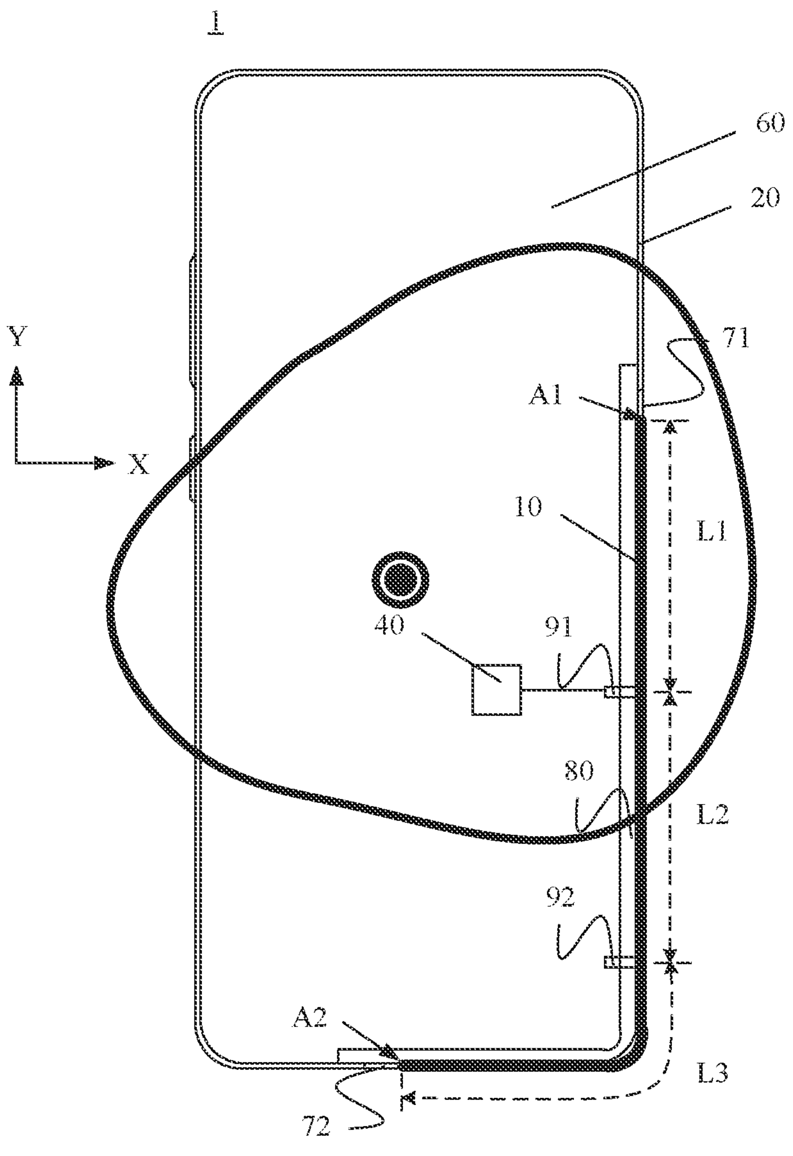
FIG. 16*a* is a radiation pattern of an antenna unit when an electrical length L2 of an antenna body from a feed point to a ground point is greater than or equal to ¼ of a first wavelength and less than ½ of the first wavelength in FIG. 3.
Figure 16B:
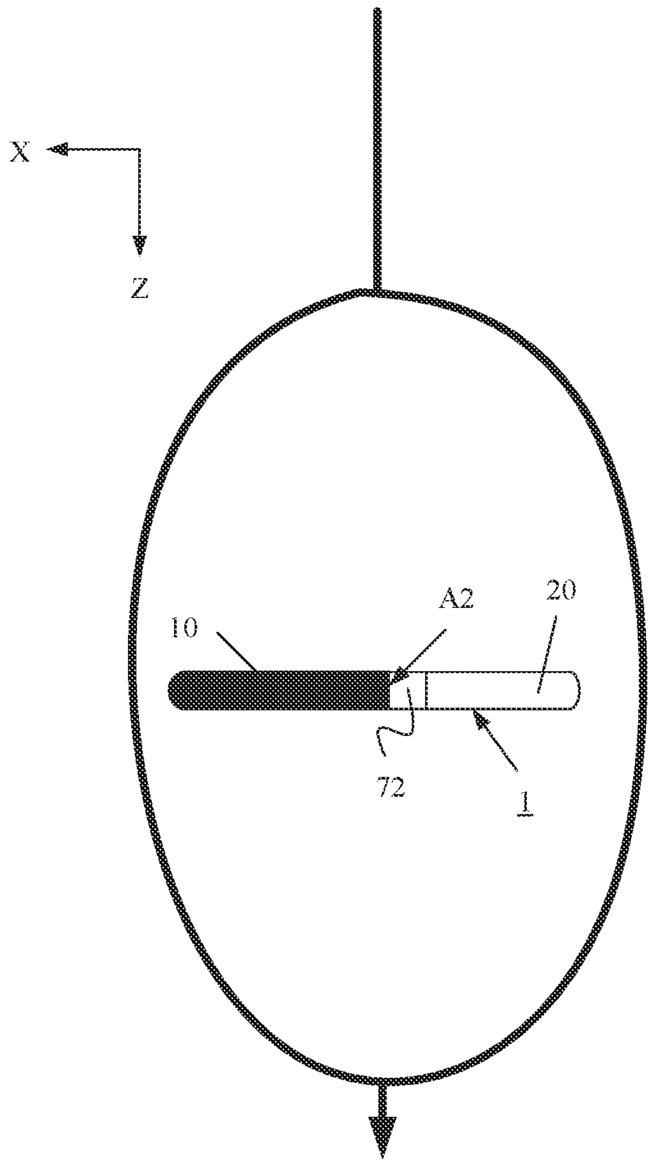
FIG. 16*b* is a radiation pattern of an antenna unit when an electrical length L2 of an antenna body from a feed point to a ground point is greater than or equal to ¼ of a first wavelength and less than ½ of the first wavelength in FIG. 3.

As shown in FIG. 16*a* and FIG. 16*b*, when the electrical length L2 of the antenna body 11 from the feed point 12 to the ground point 13 is greater than or equal to ¼ of a first wavelength and less than ½ of the first wavelength, a maximum radiation direction of the antenna unit 10 is a direction pointed to by a bold arrow, that is, a thickness direction (a Z direction in FIG. 16*b*) of the electronic device 1. As shown in FIG. 17, when the electrical length L2 of the antenna body 11 from the feed point 12 to the ground point 13 is less than ¼ of the first wavelength, a maximum radiation direction of the antenna unit 10 is a direction pointed to by a bold arrow, that is, an oblique direction that has an included angle with the thickness direction (the Z direction in FIG. 16*b*) of the electronic device 1.

Figure 17:
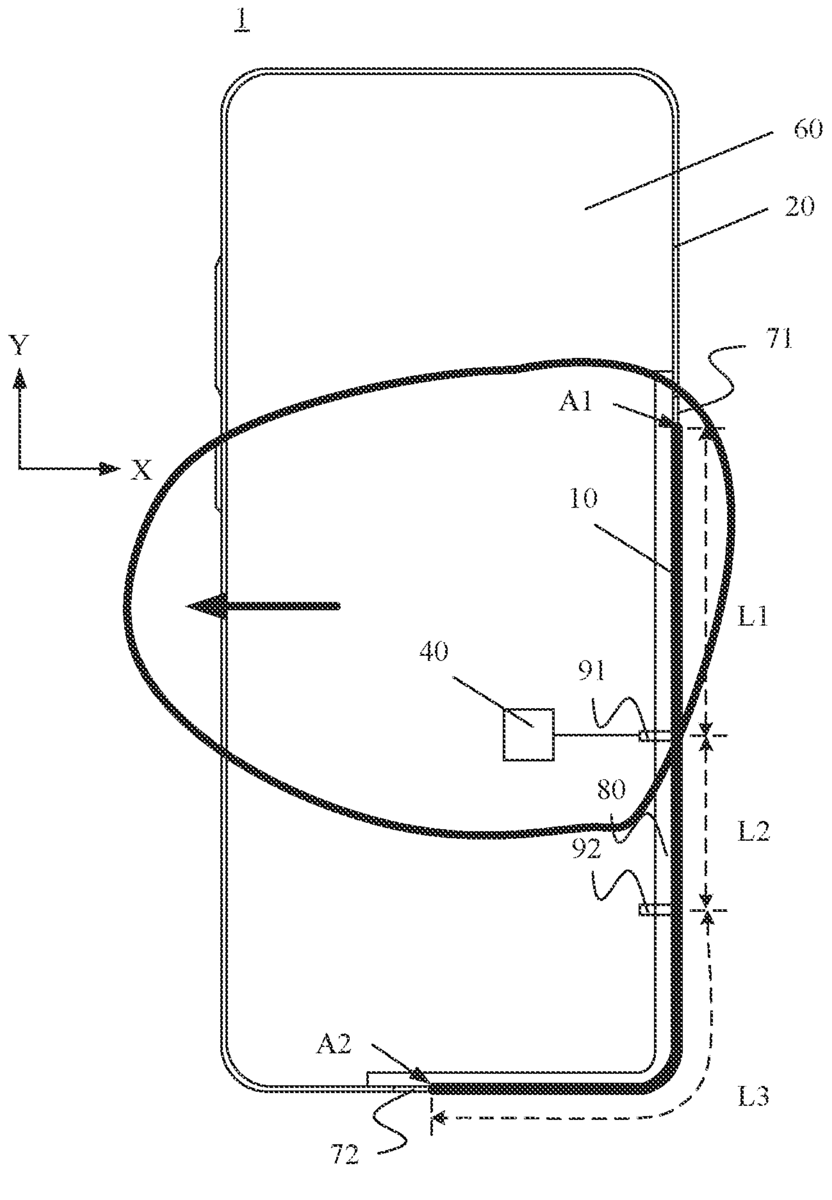
FIG. 17 is a radiation pattern of an antenna unit when an electrical length L2 of an antenna body from a feed point to a ground point is less than ¼ of a first wavelength in FIG. 3.

It can be learned from FIG. 16*a*, FIG. 16*b*, and FIG. 17 that when a hand holds the electronic device 1 and the antenna unit 10 works in a slot-wire mode, because the maximum radiation direction of the antenna unit 10 in FIG. 16*a* and FIG. 16*b* is the thickness direction (that is, the Z direction) of the electronic device 1, the antenna unit 10 in this application is slightly affected by hand holding or is not affected by hand holding. Because there is an included angle between the maximum radiation direction of the antenna unit 10 in FIG. 17 and the thickness direction (that is, the Z direction) of the electronic device 1, the maximum radiation direction may be split into a length direction (that is, an X direction) of the electronic device 1 and a width direction (that is, a Y direction) of the electronic device 1. As a result, the antenna unit 10 in FIG. 17 is affected by hand holding, and even a dead grip occurs. This reduces radiation performance of the antenna unit 10.

Figure 18:
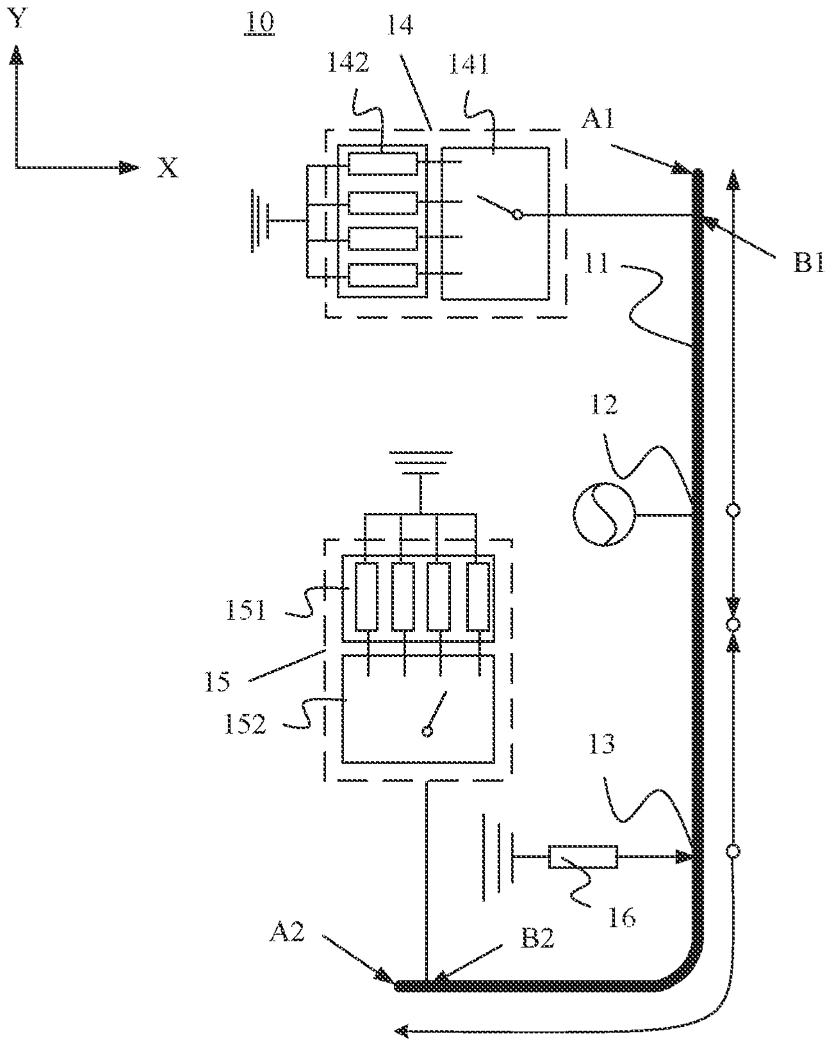
FIG. 18 is a schematic diagram of a. structure of an antenna unit according to an embodiment of this application.

Based on the embodiment shown in FIG. 2*a*, different from FIG. 2*a*, FIG. 18 shows that the antenna unit 10 in this application may further include a first matching component 14. A first end of the first matching component 14 is connected to a first connection point B1, the first connection point B1 is located between the first end A1 of the antenna body 11 and the feed point 12, and a second end of the first matching component 14 is grounded. It should be noted that the first connection point B1 in this application is not an actual point, and a position at which the first matching component 14 is connected to the antenna body 11 is the first connection point B1.

Disposing the first matching component 14 can change an electrical length L1 of the antenna body 11 from the first end A1 of the antenna body 11 to the feed point 12, so that the antenna body 11 can switch in different operating frequency bands, and the antenna body 11 is also applicable to communication in different operating frequency bands.

In some embodiments, the first matching component 14 may include a first switching switch 141 and at least one grounded first tuning element 142. A first end of the first switching switch 141 is connected to the first connection point B1, and a second end of the first switching switch 141 may be switched to connect to at least one first tuning element 142, so that the at least one first tuning element 142 is connected to the antenna body 11, to adjust the electrical length L1 of the antenna body 11 from the first end A1 of the antenna body 11 to the feed point 12. in this way, an operating frequency generated by a resonance of the antenna body 11 changes, thereby helping the antenna body 11 cover different operating frequency bands.

The first switching switch 141 may be various types of switching switches. For example, the first switching switch 141 may be a physical switch such as a single-pole single-throw switch, a single-pole multi-throw switch, or a multi-pole multi-throw switch, or may be a switchable interface such as a mobile industry processor interface (mobile industry processor interface, MIPI) or a general-purpose input/output (general-purpose input/output, GPIO) interface. The first tuning element 142 may be any one of a capacitor, an inductor, and a resistor, or may be a plurality of a capacitor, an inductor, and a resistor connected in series and/or in parallel. This is not limited in this application. When there are a plurality of first tuning elements 142, the plurality of first tuning elements 142 may be first tuning elements 142 of different types, or may be first tuning elements 142 of a same type with different sizes. This is not limited in this application either.

In some embodiments, the first switching switch 141 includes a first movable end and at least one first non-movable end. A first end of the first movable end away from the first non-movable end is connected to the first connection point B1, and a second end of the first movable end may be electrically connected to at least one first non-movable end through switching. For any first tuning element 142, a first end of the first tuning element 142 is electrically connected to a first non-movable end, and a second end of the first tuning element 142 is grounded.

Based on the foregoing connection relationship, the first movable end is switched to connect to at least one first non-movable end, that is, the first movable end is movable, the first movable end may be controlled to be connected to any first non-movable end, and the first movable end may be further switched to connect to another first non-movable end from the first non-movable end, so that when the first movable end is connected to any first non-movable end, the first tuning element 142 connected to the first non-movable end is connected to the antenna body 11, to adjust an electrical length of the antenna body 11 and change an operating frequency generated by a resonance of the antenna body 11.

Based on the embodiment shown in FIG. 2*a*, different from FIG. 2*a*, FIG. 18 still shows that the antenna unit 10 in this application may further include a second matching component 15. A first end of the second matching component 15 is connected to a. second connection point B2, the second connection point B2 is located between the ground point 13 of the antenna body 11 and the second end A2 of the antenna body 11, and a second end of the second matching component 15 is grounded. It should be noted that the second connection point B2 in this application is not an actual point, and a position at which the second matching component 15 is connected to the antenna body 11 is the second connection point B2.

Disposing the second matching component 15 can change an electrical length L3 of the antenna body 11 from the ground point 13 to the second end A2 of the antenna body 11, so that the antenna body 11 can switch in different operating frequency bands, and the antenna body 11 is also applicable to communication in different operating frequency hands.

In some embodiments, the second matching component 15 may include a second switching switch 151 and at least one grounded second tuning element 152. A first end of the second switching switch 151 is connected to the second connection point B2, and a second end of the second switching switch 151 may be switched to connect to at least one second tuning element 152, so that the at least one second tuning element 152 is connected to the antenna body 11, to adjust the electrical length L3 of the antenna body 11 from the ground point 13 to the second end A2 of the antenna body 11. In this way, an operating frequency generated by a resonance of the antenna body 11 changes, thereby helping the antenna body 11 cover different operating frequency bands.

The second switching switch 151 may be various types of switching switches. For example, the second switching switch 151 may be a physical switch such as a single-pole single-throw switch, a single-pole multi-throw switch, or a multi-pole multi-throw switch, or may be a switchable interface such as a mobile industry processor interface (mobile industry processor interface, MIPI) or a general-purpose input/output (general-purpose input/output, GPIO) interface. The second tuning element 152 may be any one of a capacitor, an inductor, and a resistor, or may be a plurality of a capacitor, an inductor, and a resistor connected in series and/or in parallel. This is not limited in this application. When there are a plurality of second. tuning elements 152, the plurality of second tuning elements 152 may be second tuning elements 152 of different types, or may be second tuning elements 152 of a same type with different sizes. This is not limited in this application either.

In some embodiments, the second switching switch 151 includes a second movable end and at least one second non-movable end. A first end of the second movable end away from the second non-movable end is connected to the second connection point B2, and a second end of the second movable end may be switched to electrically connect to at least one second non-movable end. For any second tuning element 152, a first end of the second tuning element 152 is electrically connected to a second non-movable end, and a second end of the second tuning element 152 is grounded.

Based on the foregoing connection relationship, the second movable end is switched to connect to at least one second non-movable end, that is, the second movable end is movable, the second movable end may be controlled to he connected to any second non-movable end, and the second movable end may be further switched to connect to another second non-movable end from the second non-movable end, so that when the second movable end is connected to any second non-movable end, the second tuning element 152 connected to the second non-movable end is connected to the antenna body 11, to adjust an electrical length of the antenna body 11 and change an operating frequency generated by a resonance of the antenna. body 11.

Based on the embodiment shown in FIG. 2*a*, different from FIG. 2*a*, FIG. 18 still shows that the antenna unit 10 in this application may further include a third tuning element 16 connected between the ground point 13 of the antenna body 11 and a grounding position.

The third tuning element 16 is connected between the ground point 13 and the grounding position, so as to change an electrical length L1+L2+L3 of the antenna unit 10 from the first end A1 of the antenna unit 10 to the second end A2 of the antenna unit 10 and an electrical length L1 of the antenna unit 10 from the feed point 12 to the first end A1 of the antenna unit 10 or an electrical length L2+L3 of the antenna unit 10 from the feed point 12 to the second end A2 of the antenna unit 10, thereby adjusting an operating frequency generated by a resonance of the antenna unit 10.

The grounding position refers to a position at which a ground spring contact is connected to a first end of the middle frame 60 of the electronic device 1. The third tuning element 16 may be any one of a capacitor, an inductor, and a resistor, or may be a plurality of a capacitor, an inductor, and a resistor connected in series and/or in parallel. This is not limited in this application.

Finally, it should be noted that the foregoing embodiments are merely intended for describing the technical solutions of this application other than limiting this application. Although this application is described in detail with reference to the foregoing embodiments, a person of ordinary skill in the art should understand that they may still make modifications to the technical solutions described in the foregoing embodiments or make equivalent replacements to some or all technical features thereof, without departing from the scope of the technical solutions of embodiments of this application.

What is claimed is:

1. An electronic device, comprising:
- an antenna unit comprising:
  - an antenna body comprising:
    - a first end;
    - a second end;
    - a feed point between the first end and the second end; and
    - a ground point between the first end and the second end,
    - wherein an operating band of the antenna body comprises a resonance of a first wavelength,
    - wherein an electrical length of the antenna body from the feed point to the ground point is greater than or equal to ¼ of the first wavelength and less than ½ of the first wavelength,
    - wherein an electrical length of the antenna body from the first end of the antenna body to the feed point is greater than or equal to ⅛ of the first wavelength and less than or equal to ¼ of the first wavelength, and wherein an electrical length of the antenna body from the second end of the antenna body to the ground point is greater than or equal to ⅛ of the first wavelength and less than or equal to ¼ of the first wavelength.

2. The electronic device of claim 1, wherein the operating band of the antenna body further comprises a resonance of a second wavelength, and wherein the first wavelength is greater than the second wavelength.

3. The electronic device of claim 2, wherein the antenna body is configured to generate, between the first end and the second end, the resonance of the second wavelength.

4. The electronic device of claim 2, wherein the resonance of the second wavelength is a resonance of a half wavelength mode.

5. The electronic device of claim 2, wherein a difference between a frequency of the resonance of the first wavelength and a frequency of the resonance of the second wavelength is greater than or equal to 50 Megahertz (MHz) and less than or equal to 200 MHz.

6. The electronic device of claim 2, wherein a frequency of the resonance of the first wavelength and a frequency of the resonance of the second wavelength are within a range of 699 Megahertz (MHz) to 960 MHz.

7. The electronic device of claim 1, wherein the electronic device further comprises a conductive bezel, wherein the conductive bezel comprises a first gap and a second gap, and wherein a section of the conductive bezel located between the first gap and the second gap defines the antenna body.

8. The electronic device of claim 7, wherein the conductive bezel comprises:
- a first side; and
- a second side intersecting with the first side, wherein the first side is longer than the second side, and wherein:
  - the first gap and the second gap are disposed on the first side, and at least a part of the first side defines the antenna body;
  - the first gap and the second gap are disposed on the second side, and at least a part of the second side defines the antenna body; or
  - the first gap is disposed on the first side, wherein the second gap is disposed on the second side, and at least a part of the first side and at least a part of the second side jointly define the antenna body.

9. The electronic device of claim 1, wherein the antenna unit further comprises:
- a first connection point located between the first end of the antenna body and the feed point; and
- a first matching component having a first end and a second end, wherein the first end of the first matching component is coupled with the first connection point, and wherein the second end of the first matching component is grounded.

10. The electronic device of claim 9, wherein the first matching component further comprises:
- a plurality of grounded first tuning elements; and
- a first switch having a first end and a second end, wherein the first end of the first switch is connected to the first connection point, and wherein the second end of the first switch is switchably coupled with the plurality of grounded first tuning elements.

11. The electronic device of claim 1, wherein the antenna unit further comprises:
- a second connection point located between the second end of the antenna body and the ground point; and
- a second matching component having a first end and a second end, wherein the first end of the second matching component is coupled with the second connection point, and wherein the second end of the second matching component is grounded.

12. The electronic device of claim 11, wherein the second matching component further comprises:
- a plurality of grounded second tuning elements; and
- a second switch having a first end and a second end, wherein the first end of the second switch is connected to the second connection point, and wherein the second end of the second switch is switchably coupled with the plurality of grounded second tuning elements.

13. The electronic device of claim 1, further comprising a third tuning element operably coupled between the ground point and a grounding position of the ground point.

14. An electronic device, comprising:
- an antenna unit comprising:
  - an antenna body comprising:
    - a first end;
    - a second end;
    - a feed point between the first end and the second end; and
    - a ground point between the first end and the second end,
  - wherein an operating band of the antenna body comprises a resonance of a first wavelength, wherein the antenna body between the feed point and the ground point is configured to operate in a slot mode, wherein an electrical length of the antenna body from the feed point to the ground point is greater than or equal to ¼ of the first wavelength and less than ½ of the first wavelength, and
  - wherein the antenna body between the first end and the feed point, and the antenna body between the second end and the ground point are each configured to operate in a wire mode, wherein an electrical length of the antenna body from the first end of the antenna body to the feed point is greater than or equal to ⅛ of the first wavelength and less than or equal to ¼ of the first wavelength, and wherein an electrical length of the antenna body from the second end of the antenna body to the ground point is greater than or equal to ⅛ of the first wavelength and less than or equal to ¼ of the first wavelength.

15. The electronic device of claim 14, wherein the antenna body is configured to generate, between the first end and the second end, a resonance of a second wavelength, and wherein the first wavelength is greater than the second wavelength.

16. The electronic device of claim 15, wherein a difference between a frequency of the resonance of the first wavelength and a frequency of the resonance of the second wavelength is greater than or equal to 50 Megahertz (MHz) and less than or equal to 200 MHz.

17. The electronic device of claim 14, wherein the antenna unit further comprises:
- a first connection point located between the first end of the antenna body and the feed point; and
- a first matching component having a first end and a second end, wherein the first end of the first matching component is coupled with the first connection point, and wherein the second end of the first matching component is grounded.

18. The electronic device of claim 14, wherein the antenna unit further comprises:
- a second connection point located between the second end of the antenna body and the ground point; and
- a second matching component having a first end and a second end, wherein the first end of the second matching component is connected to the second connection point, and wherein the second end of the second matching component is grounded.

19. The electronic device of claim 14, further comprising a third tuning element operably coupled between the ground point and a grounding position of the ground point.

20. The electronic device of claim 17, wherein the first matching component further comprises:
- a plurality of grounded first tuning elements; and
- a first switch having a first end and a second end, wherein the first end of the first switch is connected to the first connection point, and wherein the second end of the first switch is switchably coupled with the plurality of grounded first tuning elements.

* * * * *